US006859988B2

(12) United States Patent
Lovchik et al.

(10) Patent No.: US 6,859,988 B2
(45) Date of Patent: Mar. 1, 2005

(54) PROCESSOR-CONTROLLED CARVING AND MULTI-PURPOSE SHAPING DEVICE

(75) Inventors: Christopher Scott Lovchik, Pearland, TX (US); James David Jochim, Nassau Bay, TX (US); Dennis Girard Lawler, Houston, TX (US)

(73) Assignee: LHR Technologies, Pasadena, TX (US)

(*) Notice: Subject to any disclaimer, the term of this patent is extended or adjusted under 35 U.S.C. 154(b) by 94 days.

(21) Appl. No.: 10/206,851

(22) Filed: Jul. 25, 2002

(65) Prior Publication Data

US 2003/0066574 A1 Apr. 10, 2003

Related U.S. Application Data

(60) Provisional application No. 60/307,910, filed on Jul. 25, 2001.

(51) Int. Cl.$^7$ .................................................. B23P 23/00

(52) U.S. Cl. .......................... 29/558; 29/26 A; 29/56.5; 409/132; 409/149; 409/212; 144/117.1; 144/135.2; 474/150

(58) Field of Search ................................ 409/131, 132, 409/145, 147, 149, 202, 212; 29/26 R, 26 A, 56.5; 144/317.1, 135.2, 117.1; 474/148, 150

(56) References Cited

U.S. PATENT DOCUMENTS 1,143,585 A * 6/1915 Johnson ...................... 409/213
2,491,605 A 12/1949 Chittenden (List continued on next page.)

FOREIGN PATENT DOCUMENTS

| | | | |
|---|---|---|---|
| DE | 3336496 A1 * | 4/1985 | |
| FR | 2771324 A1 * | 5/1999 | |
| GB | 686089 | 5/1951 | |
| JP | 7-210222 A * | 8/1995 | |
| WO | WO 95/32830 | 12/1995 | |

OTHER PUBLICATIONS

PCT/US02/23912 International Search Report Mailed Mar. 14, 2003.

PCT/US02/23912 Correspondence From the International Searching Authority Mailed Jul. 23, 2003.

*Primary Examiner*—Erica Cadugan
(74) *Attorney, Agent, or Firm*—Trop, Pruner & Hu, P.C.

(57) ABSTRACT

One embodiment of the present invention is a compact, low-cost, lightweight, versatile and easy-to-operate, processor-controlled carving and multi-purpose shaping device ("PCCMPS machine"). The PCCMPS machine that represents one embodiment of the present invention is configured, in part, similarly to common, commercially available portable wood planers and ubiquitous laser and ink-jet computer printers, with work pieces fed into the PCCMPS machine in a horizontal direction. The PCCMPS machine includes a motor-powered cutting head that can power detachable bits to drill, cut, shape, and rout a work piece under processor and computer control. The cutting head may be translated, under processor control, back and forth across the surface of the work piece in a direction perpendicular to the direction in which the work piece is fed into the PCCMPS machine and moved by motor-powered rollers. The cutting head may be translated up and down, in a vertical direction, approximately perpendicular to the surface of the work piece. The processor can thus position a cutting bit at any point on a surface of, near the surface of, or within the work piece, via a combination of lateral and vertical translations of the cutting head and horizontal translation of the work piece, and can control the speed at which the bit rotates as the computer moves the rotating bit from one position to another position relative to the surface of the work piece in order to carve and shape elaborate, three-dimensional designs onto the work piece.

18 Claims, 23 Drawing Sheets

U.S. PATENT DOCUMENTS

| | | | | | |
|---|---|---|---|---|---|
| 3,434,242 | A | * | 3/1969 | Corey | 451/124 |
| 3,622,169 | A | | 11/1971 | Koch et al. | |
| 3,708,178 | A | | 1/1973 | Lauricella | |
| 3,967,830 | A | | 7/1976 | Smith | |
| 4,083,390 | A | * | 4/1978 | Ingham | 144/136.9 |
| 4,436,463 | A | | 3/1984 | Rea | |
| 4,449,986 | A | * | 5/1984 | Held | 29/26 A |
| 4,621,407 | A | | 11/1986 | Suzuki | |
| 4,636,938 | A | * | 1/1987 | Broome | 700/86 |
| 4,987,668 | A | * | 1/1991 | Roesch | 483/30 |
| 4,993,997 | A | * | 2/1991 | Stuhler | 474/165 |
| 5,340,247 | A | | 8/1994 | Cuneo et al. | |
| 5,445,045 | A | * | 8/1995 | Nagai et al. | 74/490.09 |
| 5,453,933 | A | * | 9/1995 | Wright et al. | 700/181 |
| 5,575,318 | A | * | 11/1996 | Susnjara | 144/2.1 |
| 5,787,566 | A | * | 8/1998 | Stursberg | 29/558 |
| 5,833,407 | A | | 11/1998 | Senda | |
| 5,988,239 | A | * | 11/1999 | Chen | 144/129 |
| 6,019,554 | A | | 2/2000 | Hong | |
| 6,112,133 | A | * | 8/2000 | Fishman | 700/182 |
| 6,262,839 | B1 | * | 7/2001 | Wixey et al. | 359/438 |
| 6,327,761 | B1 | * | 12/2001 | Magnuson | 29/33 Q |
| 6,347,259 | B1 | | 2/2002 | Goldenberg et al. | |
| 2002/0028118 | A1 | * | 3/2002 | Laur et al. | 409/132 |
| 2002/0054800 | A1 | * | 5/2002 | Hwu et al. | 409/116 |
| 2004/0003867 | A1 | * | 1/2004 | Chiang | 144/117.1 |

* cited by examiner

PROCESSOR-CONTROLLED CARVING AND MULTI-PURPOSE SHAPING DEVICE

CROSS-REFERENCE TO RELATED APPLICATION

This application claims the benefit of provisional Patent Application No. 60/307,910, filed Jul. 25, 2001.

TECHNICAL FIELD

The present invention relates to wood-working machines and other similar materials-processing machines and, in particular, to a carving and shaping machine into which work pieces are horizontally fed, like paper is fed into a computer printer and work pieces are fed into a portable planar, and that employs a laterally and vertically translatable, motor-powered processor-controlled cutting tool to carve and shape a work piece according to electronically stored directives or designs.

BACKGROUND OF THE INVENTION

Computer-controlled carving machines, referred to as "CNC routers," have been commercially available for some time. CNC routers are expensive and large relative to the size of the work piece that they can be employed to shape and rout. CNC routers evolved from heavy-duty, metalworking machine tools that employ flat bed, x, y, z configurations, and commercially available CNC routers have retained this x, y, z configuration. The x, y, z configuration refers to the fact that CNC routers, and the heavy-duty, metalworking machine tools from which they evolved, require a work piece to be statically fixed to a bed within the CNC routers and metalworking machine tools. The CNC routers and metalworking machine tools employ a motor-driven cutting head that can be controlled, by computer, to move in the familiar, orthogonal x, y, and z directions of three-dimensional space. In other words, the work piece remains statically positioned during carving, while the cutting head is positioned via a series of x, y, and z translations to the required positions on the surface of, and within, the work piece. Thus, CNC routers are larger in size than the maximally sized work piece that can be used to carve and shape.

CNC routers suffer from a number of deficiencies, in addition to large physical size relative to the maximally sized work piece on which they can operate. First, the large bed required to support large work pieces adds considerably to the cost of CNC routers. The large bed size also adds considerable weight to the overall weight of CNC routers, since the large bed must be thickly cast or otherwise rigidly constructed to avoid sagging and other shape alterations. CNC routers require stiff and rigid components, because positionally accuracy of the cutting head under computer control is possible only when x, y, and z translations of the cutting head predictably and reliably position the cutting head with respect to the bed, and the work piece affixed to the bed. In general, CNC routers employ non-intuitive, and difficult-to-learn operator interfaces, and programming of CNC routers generally requires considerable training.

CNC routers, despite their disadvantages, have enormous usefulness in wood working and in carving and shaping other rigid and semi-rigid materials. Wood workers, manufacturers, carpenters, artists, hobbyists, and others who carve and shape rigid and semi-rigid materials have thus recognized a need for a cheaper, smaller, lighter, and easier-to-use processor-controlled carving and shaping device.

SUMMARY OF THE INVENTION

One embodiment of the present invention is a compact, low-cost, lightweight, versatile and easy-to-operate, processor-controlled carving and multi-purpose shaping device ("PCCMPS machine"). The PCCMPS machine that represents one embodiment of the present invention is configured, in part, similarly to common, commercially available portable wood planers and ubiquitous laser and ink-jet computer printers. As with portable planers and computer printers, a work piece is fed into the PCCMPS machine in a horizontal direction. However, unlike a portable planer or computer printer, once the work piece is fed sufficiently far into the PCCMPS machine to be securely clamped by rollers, the work piece may be translated by the PCCMPS machine both forwards and backwards in the horizontal direction under processor control.

The PCCMPS machine that represents one embodiment of the present invention includes a motor-powered cutting head that can power detachable bits to drill, cut, shape, and rout a work piece under processor and computer control. The cutting head may be translated, under processor control, back and forth across the surface of the work piece in a direction perpendicular to the direction in which the work piece is fed into the PCCMPS machine and moved by motor-powered rollers. The cutting head may be translated up and down, in a vertical direction, approximately perpendicular to the surface of the work piece. The processor can thus position a cutting bit at any point on a surface of, near the surface of, or within the work piece, via a combination of lateral and vertical translations of the cutting head and horizontal translation of the work piece, and can control, the speed at which the bit rotates as the computer moves the rotating bit from one position to another position relative to the surface of the work piece.

The PCCMPS machine can carve and shape elaborate, three-dimensional designs onto the work piece, limited in fineness of detail only by the shape and dimensions of the replaceable bit as well by the rigidity of the rotating bit. The designs are also constrained by the vertical mounting of the rotating bit within the cutting head, in the described embodiment, although that constraint can be largely relaxed by incorporating cutting heads that can be arbitrarily aligned with respect to a normal to the plane of the work piece, incorporating multiple cutting heads, and positioning cutting heads above, below, and to the sides of the work piece. In addition to the portable, planer-like work-piece-feed-through configuration, the PCCMPS machine employs torsion rods to stiffen a head-assembly of the PCCMPS machine sufficiently to ensure accurate positioning of the cutting bit, and uses a flexible, cutting-head drive shaft to reduce the mass of the cutting head and to allow for high-speed operation of lateral and vertical cutting head translators without the need for large, expensive drive motors.

Alternate embodiments may include many different types of work-piece-feed mechanisms, or horizontal translators. A PCCMPS machine may include various types of sensors to feed back information to a processor or other controller to allow the processor or other controller to monitor may different conditions, component and work-piece positions, and other parameters related to the work piece and components of the PCCMPS machine. An almost limitless number of different control programs and user interfaces may be developed to facilitate design specification and operation by users, and run on a host computer interconnected with the processor built into the PCCMPS machine. In the described embodiment, a mechanical cutting head is employed, but other types of cutting heads, such as laser heads, abrasive heads, air streams, liquid streams, electric arcs, and other such devices may be employed within a PCCMPS machine to carve, shape, ablate, melt, or otherwise modify the surface or surface characteristics of work pieces composed of rigid and/or semi-rigid substances. In alternate embodiments the PCCMPS machine can be selectively manually controlled, rather than controlled only through the computer interface.

DETAILED DESCRIPTION OF THE INVENTION

Figure 1:
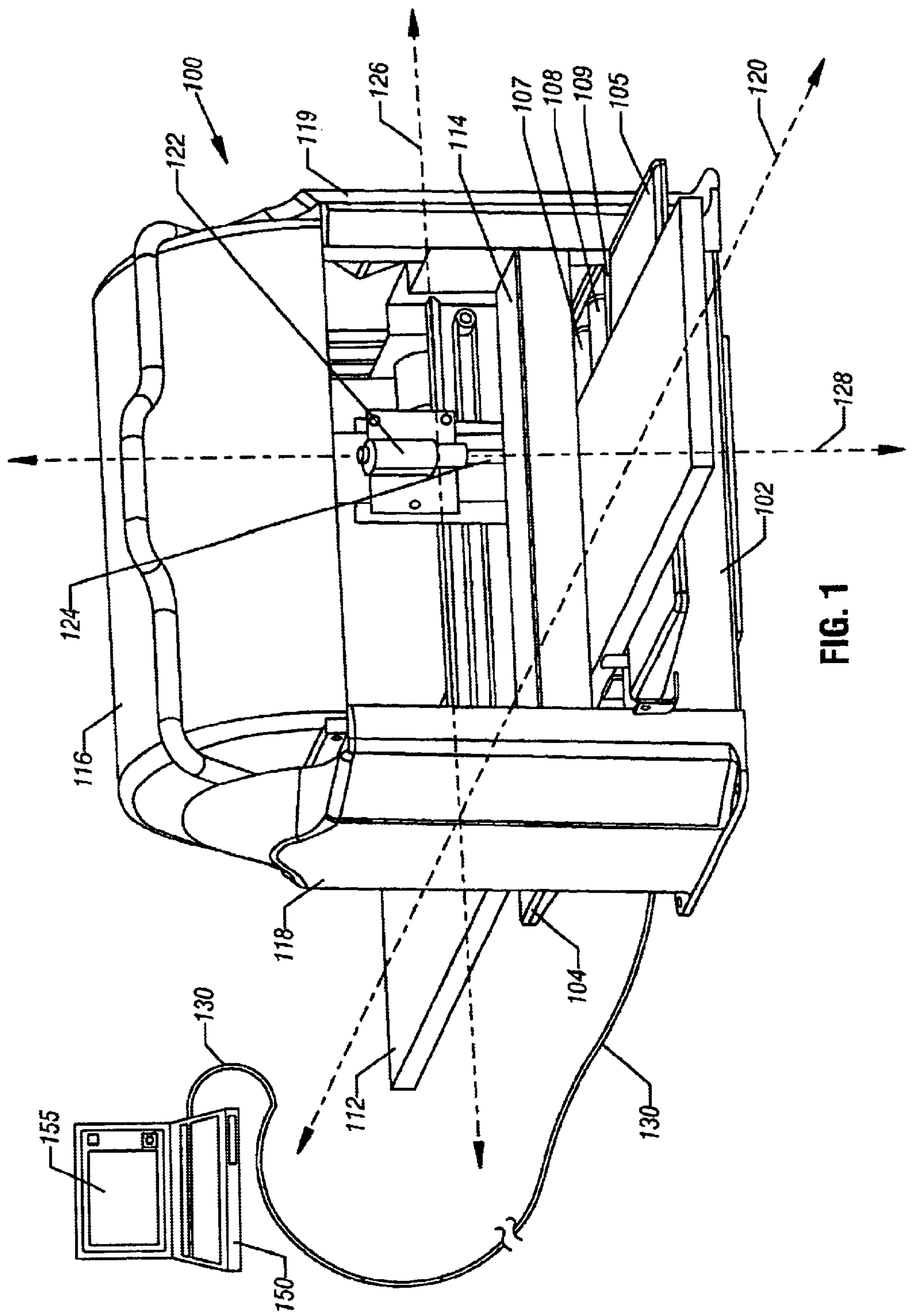
FIG. 1 shows a perspective view of a PCCMPS machine that represents one embodiment of the present invention.

One embodiment of the present invention is a compact, low-cost, lightweight, versatile and easy-to-operate processor-controlled carving and multi-purpose shaping device ("PCCMPS") that can be employed to produce three-dimensional carvings and to otherwise shape surfaces of a work piece composed of one or a combination of rigid or semi-rigid materials, such as wood, plastic, laminates or other such materials. FIG. 1 shows a perspective view of a PCCMPS machine that represents one embodiment of the present invention. This embodiment will be described in detail below. Note that numerical labels are reused in subsequent figures to label the component or feature that they first identify, in the interest of clarity and brevity.

As shown in FIG. 1, the PCCMPS machine 100 includes a base 102, feed trays 104 and 105, and lower rollers 107–109 (one lower roller obscured in FIG. 1) that together comprise a horizontal surface, or truncated bed, that supports and horizontally translates a work piece 112, a head assembly 114, and top 116 and side 118–119 covers that cover an internal frame (not showing in FIG. 1) that supports the head assembly 114 in a position above the work piece 112. The head assembly 114 includes two clamping rollers (not shown in FIG. 1) that clamp the work piece 112 between the clamping rollers and lower rollers 107–109. The lower rollers are motor driven to translate the work piece 112 both forward and backward in a horizontal, or x, direction 120. The work piece 112 may be manually fed into the PCCMPS machine 100 until it engages with, and is clamped by, the clamping rollers and lower rollers 107–109, after which translation of the work piece in the x direction is subsequently carried out under computer control by the PCCMPS machine. In addition to clamping rollers contained in the head assembly 114, the head assembly 114 includes a cutting head assembly 122 that includes a bit adapter 124 that holds a drilling, cutting, shaping, routing, or other type of bit (not shown in FIG. 1) that is rotated and that is positioned onto, and moved across and into, the work piece 112 in order to carve and shape the work piece. The head assembly 114 includes lateral and vertical translation means to translate, under processor control, the cutting head assembly 122 in a lateral, or y, direction 126 and in a vertical, or z, direction 128, respectively.

Processor control of the cutting head assembly 122 in the y and z directions 126 and 128, and processor control of the work piece 112 in the x direction 120, allows for arbitrary positioning of the cutting, drilling, shaping, routing, or other bit (not shown in FIG. 1) with respect to the work piece 112 and for moving the drilling, cutting, shaping, routing, or other bit in arbitrary straight-lines, 2-dimensional curves, across 2-dimensional surfaces arbitrarily oriented in three dimensions, and in 3-dimensional curves in order to drill, cut, shape, and rout the work piece in an almost limitless number of ways. For example, a lateral groove may be routed into the surface of the work piece 112 by positioning a routing bit to one side of the work piece, at a specified depth with respect to the surface of the work piece, and translating the rotating cutting head in the y direction 126 across the work piece. As another example, a linear groove parallel to the sides of the work piece may be inscribed into the surface of the work piece by positioning a rotating routing bit mounted within the cutting head assembly 122 at specified depth into the surface of the work piece 112, and then translating the work piece in the x direction 122 to a specified ending position. Simultaneous translation of the work piece 112 in the x direction 120 and of the cutting head assembly 122 in the y direction 126 may be used to inscribe curved grooves or features in the plane of the surface of the work piece 112, and by translating the work piece 112 in the x direction 120 while simultaneously translating the cutting head assembly 122 in both the y and z directions 126 and 128, complex three dimensional straight lines and curves, such as spirals, may be cut into the work piece 112.

Note that the portable-planer-like or computer-printer-like feed mechanism of the PCCMPS allows the PCCMPS to be relatively small with respect to size of work pieces that the PCCMPS machine can be employed to carve and shape. Thus, the portable-planer-like or computer-printer-like work-piece feed configuration is an important factor in reducing the size and weight of the PCCMPS machine with respect to CNC routers and heavy-duty, metalworking machine tools. The ability to precisely translate the work piece 112 in the x direction 120 and to precisely translate the cutting head assembly 112 in the y and z directions 126 and 128, as well as the ability to control the speed of the motor driving rotation of the cutting head 122 and the speed of the x-direction translation of the work piece 112 and the y and z-direction translations of the cutting head assembly 122 allow for extremely precise drilling, cutting, shaping, routing, and other modification of the work piece by the rotating bit mounted to the cutting head assembly 122. An additional and important degree of freedom is the fact that various different drilling, cutting, routing, shaping, and other work-piece-modifying bits may be mounted, at different times, within the cutting head assembly 122, providing for a variety of widths, cutting edge sizes, shapes, and orientations, and abrasive-tool surface shapes, sizes and orientations for carving and shaping the surface of the work piece.

Additional advantages of the configuration of the PCCMPS machine include the fact that the PCCMPS machine can accommodate work pieces of a wide variety of thickness, in one embodiment ¼" to 6", due to vertical translation of the cutting head assembly 122. The PCCMPS machine may include a number of sensors, including optical sensors, not shown in FIG. 1, that allow the PCCMPS to sense, and report to a built-in processor controller, the positions and shapes of the work piece 112. The PCCMPS machine may include a load-sensing sensor, also not shown in FIG. 1, that can sense and report to the controlling computer the speed of the motor driving the rotation of the cutting head, so that the PCCMPS machine can adjust the weight of the work piece and cutting-head assembly translation in order to maintain a relatively even load on a drilling, cutting, routing, shaping, or other type of bit to avoid excessive wear and tear on the PCCMPS machine assemblies and the bit, and to avoid burning, melting, or shattering the work piece.

Easy replacements of bits and precise computer control of the position and movement of the work piece and cutting-head assembly allow the PCCMPS machine to perform a huge number of different tasks. The PCCMPS machine can cut material in any of almost limitless different patterns, producing curved pieces, scroll work, pieced carvings, and an almost limitless number of other shapes and topologies. A PCCMPS machine can plane and joint the edges of a work piece, cut curved moldings, and produce finished work pieces, the production of which would otherwise require a large number of different, expensive, and differently operated tools.

A final feature of the PCCMPS configuration, shown in FIG. 1, is that the positioning of the clamping rollers with respect to the lower rollers 107–109 and cutting-head assembly 122 allows the work piece to be securely clamped by a combination of one clamping roller and a sub-set of the lower rollers and feed trays. Thus, the work piece can be securely clamped to either side of the cutting-head assembly 122, allowing for cutting and shaping of the ends and sides of the work piece, in addition to the top surface of the work piece. In alternative embodiments, multiple cutting heads may be employed, and cutting heads may be provided with additional degrees of freedom so that the alignment of the axis of the rotating bit may be varied the respect to the surface of the work piece, and so that cutting heads may approach the work piece both from above and below the work piece in order to drill, cut, rout, shape, or otherwise modify the top and bottom surfaces of the work piece.

The described embodiment of the PCCMPS machine includes a processor controller that may be connected to a host PC or other computer system via a computer-connection cable 130. The PCCMPS controller, like controllers of many types of electronic and electromechanical devices, is responsible for real-time control of the PCCMPS machine and for stand-alone control of the PCCMPS machine. In most applications, over all control of the PCCMPS machine is the responsibility of a host computer system, such as host personal computer 150, interconnected with the PCCMPS controller via the computer-connection cable 130, shown in FIG. 1. The PCCMPS controller monitors environmental inputs from various sensors included in the PCCMPS machine, that may include sensors to detect the shape and position of the work piece, the load on the cutting head, temperature of various positions and of various components of the PCCMPS machine, and other sensors. The host PC 150 generates command sequences based on stored designs, templates, and directives generated partially or completely as a result of interaction of a human user with the host PC 150, and transmits the commands the controller, which then controls the PCCMPS components to effect each command. The PCCMPS controller facilitates safe operation of the PCCMPS machine by sensing, via various sensors embedded in the PCCMPS machine unsafe conditions, and shutting down one or more components, such as the motors driving rotation of the cutting head and translation of the work piece and cutting-head assembly, to prevent catastrophic failures. The PCCMPS controller may contain sufficient memory to store a variety of command sequences to allow for a command-based, stand-alone operation initiated and directed by a user through a control panel independent of the host PC graphical user interface ("GUI") 155, shown in FIG. 1.

The host PC 150 connected to the PCCMPS machine provides a GUI 155 that allows a user to draw, or compose, designs and templates reflecting an almost limitless number of combinations of elementary operations defined by a combination of a particular drilling, cutting, routing, shaping, or other bit with positions, lines, and curves. In addition, a user may elect to call up, through the GUI, a wide variety of stock templates and designs that can be stretched and fit to particular work piece. A probe bit mounted to the cutting head may allow the PCCMPS machine, under direction of the PC host 150, to mechanically scan a particular work piece in three dimensions in order to determine the shape and dimensions of the work piece. Once the shape and dimensions of the work piece are determined, the sophisticated GUI 155 provides a user with the ability to draw or compose a desired pattern and shape for the finished work piece based on the initial shape and dimensions of the work piece. In addition, existing carvings and already shaped materials can be digitally scanned using the probe mounted within the cutting head to digitally store the design of the existing carving in order to reproduce that design on work piece blanks, much as a copy machine reproduces stored text on blank paper. The GUI 155 supports graphical composition, by users, of arbitrarily complex designs by combining simpler graphically portrayed elements, such as curves, lines, surfaces of various shapes and sizes, and simple designs. The GUI 155 allows a user to position the graphically displayed elements, change the sizes of the simple graphically displayed elements, and even stretch and shape the simple elements to conform to a desired design and to predetermined shape and dimensions of the work piece. Ultimately, entire project libraries may be created and electronically stored, to allow a user to create many different pieces and components of a complex object, such as a piece of furniture, a dollhouse, a business sign, a model, or another desirable object. These project libraries allow a user to choose an object, specify dimensions of the object, and to then receive from the GUI 155 a list of the type and amounts of materials needed for creating the object. Once the user acquires the specified materials, the user can then initiate the project, during which the PC host 150 prompts the user to input, in a predetermined sequence, the various materials that the PC host 150 directed the user to acquire. The GUI 155 may even specify, upon completion of the parts of a complex project, how the various parts can be assembled to produce the final, completed object. Such project libraries may include projects for building intricate and finely detailed models, including model ships, airplanes, and trains, building landscape accessories, and other such hobby items. In fact, an almost limitless number of possible projects can be imagined.

Figure 2:
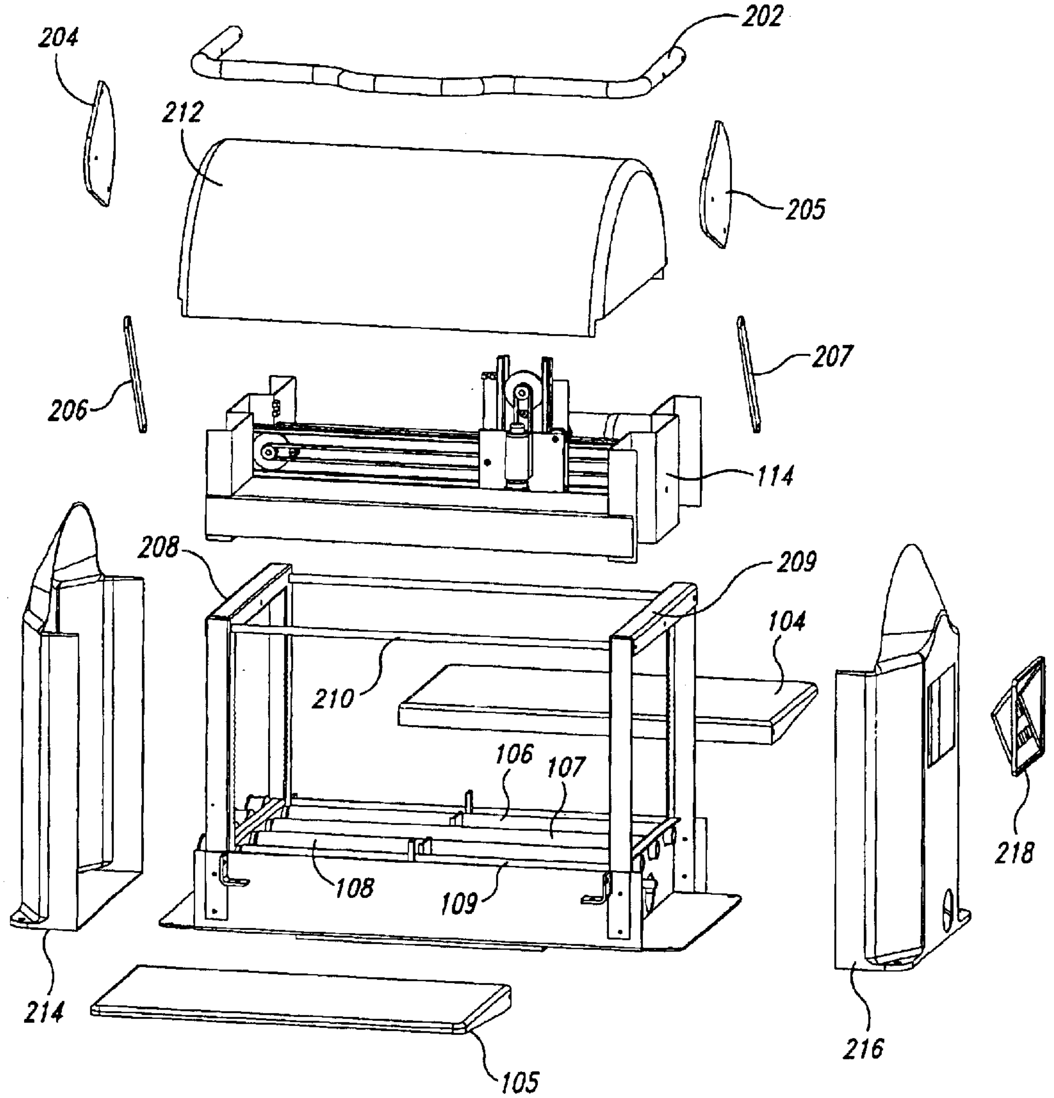
FIG. 2 is an exploded view of the described PCCMPS machine shown in FIG. 1.

FIG. 2 is an exploded view of the described PCCMPS machine shown in FIG. 1. Components of the PCCMPS machine shown in the exploded view of FIG. 2 include a head-lowering handle 202, two link plates 204–205, and two head links 206–207 that together compose a head-lowering assembly that facilitates raising and lowering the head assembly (114 in FIG. 1) in the z direction (128) in FIG. 1. The head-lowering handle 202 is attached to the two link plates 204 and 205, each of which is rotatably mounted to top members 208 and 209 of the inner frame 210 of the PCCMPS machine. The head links 206 and 207 are rotatably attached to the link plates 204 and 205, and to the head assembly 114, so that, when the handle is moved in one direction, the link plates rotate about their rotatable mountings to the frame members 208 and 209 to pull the head links 206 and 207 upward and therefore pull the entire head assembly 114 upward within the inner frame 210, and, when moved in the opposite direction, the link plates rotate about their rotatable mountings to the frame members 208 and 209 to push the head links 206 and 207 downward and therefore push the entire head assembly 114 downward within the inner frame 210. Four lower rollers 106–109 are rotatably mounted to the base on the inner frame to provide a level platform on which the work piece can move forward and backward in the x direction (120 in FIG. 1). These lower rollers are motor driven, to translate the work piece backwards and forwards in the x direction. The feed trays 104 and 105 extend the lower, horizontal platform to facilitate feeding of the work piece into the PCCMPS machine, from either side, for engagement with the lower rollers 106–109 and two clamping rollers (not shown in FIG. 2) within the head assembly 114. The feed trays provide additional support for long work pieces. The feed trays move the pivot point of the work piece further away from the PCCMPS machine, to prevent the mass of the work piece from pivoting upward and slipping. The inner frame is covered with a top cover 212 and two side covers 214 and 216. A control panel 218 is mounted within the right-hand side cover 216 to allow for stand alone operation of the PCCMPS machine via the built-in PCCMPS-machine controller, as discussed above.

Figure 3:
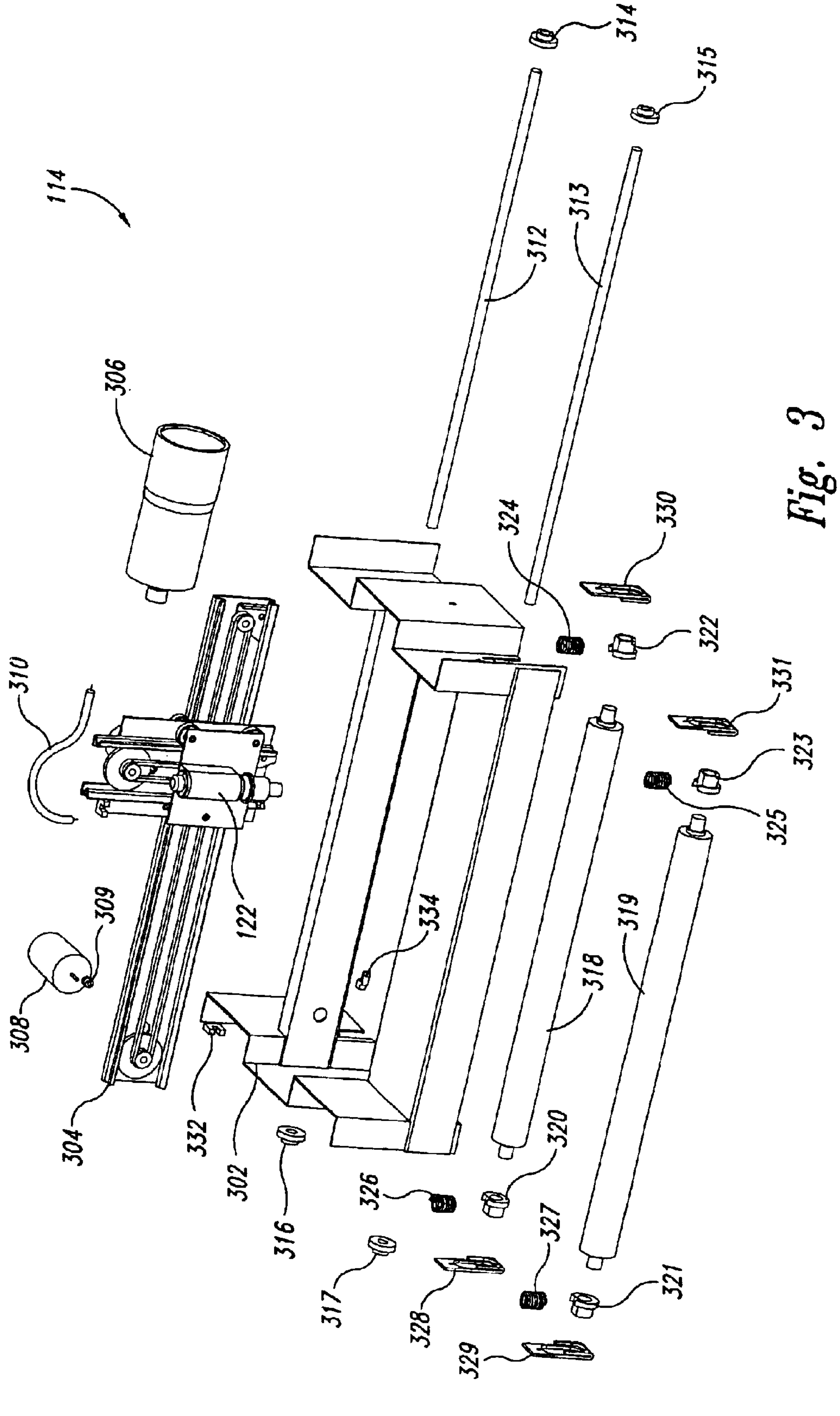
FIG. 3 is an exploded view of the head assembly (114 in FIG. 1) of the described PCCMPS machine.

FIG. 3 is an exploded view of the head assembly (114 in FIG. 1) of the described PCCMPS machine. The head assembly is organized around a head-assembly frame 302. A y-and-z-axes assembly 304 is mounted within the head-assembly frame 302. The y-and-z-axes assembly 304 includes means for translating the cutting head assembly 122 in the y-direction and z-direction. Rotation of the cutting head is driven by a cutting motor 306. The y-direction translation means of the y-and-z-axis assembly 304 is powered by a y-axis drive motor 308. A flex-shaft assembly 310 transfers mechanical rotation from the cutting-head motor 306 to the cutting-head assembly 122. Two torsion rods 312 and 313 are rotatably mounted to the head-assembly frame 302, and each torsion rod 312 and 313 is capped, at both ends, with torsion-rod pinions 314–317. Two clamping rollers 318–319 are rotatably mounted to clamping-roller bushings 320–323, in turn mounted to four clamping-roller mounts 328–331. The clamping rollers are designed to exert a downward, vertical clamping force on the work piece that is held relatively constant, despite variations in work piece thickness, by four clamping-roller springs 324–327. The four clamping-roller mounts 328–331 are affixed to the head-assembly frame 302. A y-axis homing sensor 322, and a bit-sensor emitter 334, are fixed to the head-assembly frame 302. Y-direction translation power is transmitted to the y-direction translation means from the y-axis drive motor 308 via a y-axis pinion 309 attached to the shaft of y-axis drive motor. A y-axis homing sensor 332 and the bit sensor emitter 334 are mounted to the head-assembly frame 302, as shown in FIG. 3.

Figure 4:
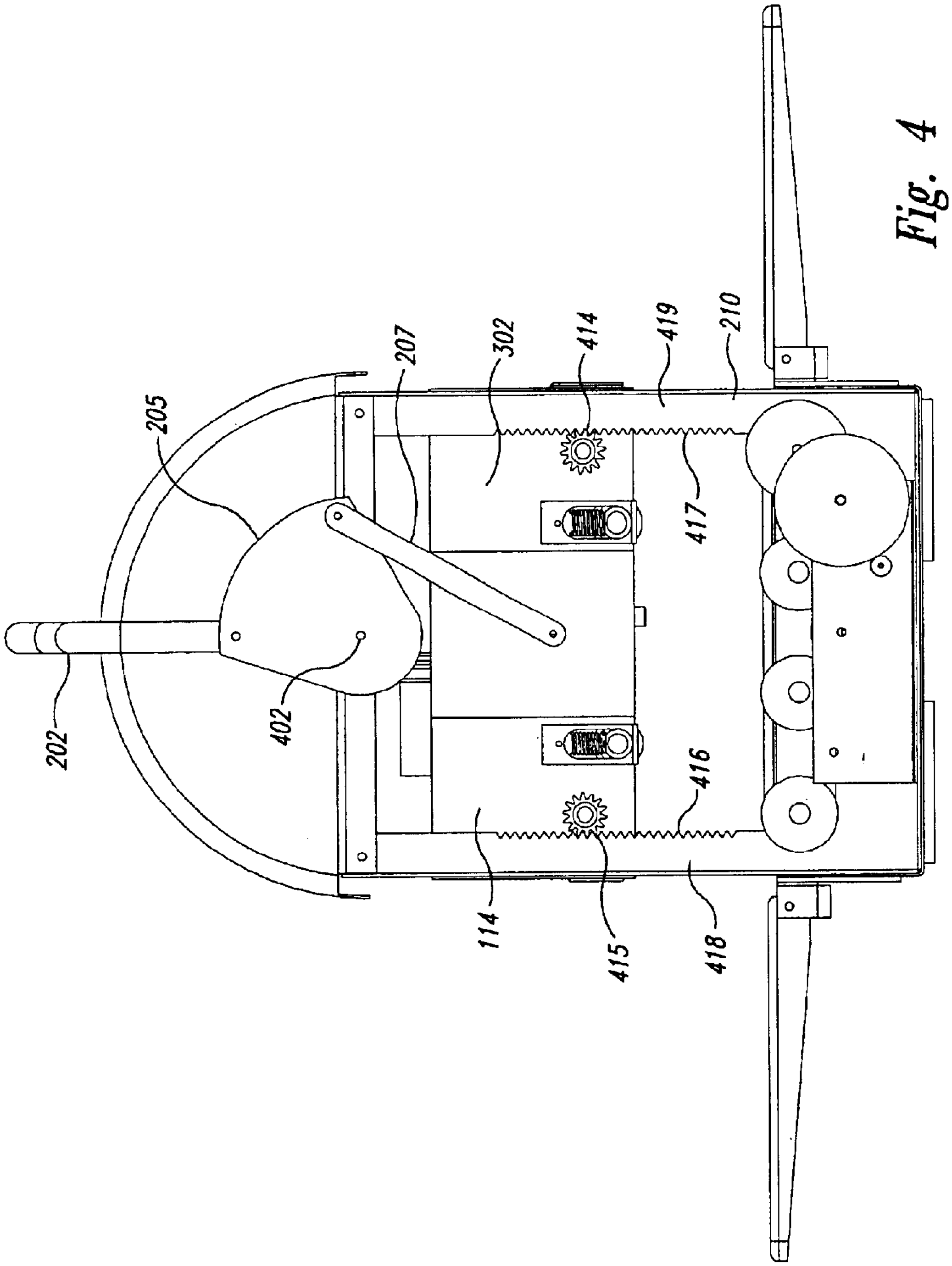
FIG. 4 is a vertical-section view of the described PCCMPS machine showing the configuration of the head-lowering handle, link plate, and link with respect to the inner frame and head assembly of the described PCCMPS machine, as well as engagement of the torsion-rod pinions with a corresponding rack on the inner frame of the described PCCMPS machine.

FIG. 4 is a vertical-section view of the described PCCMPS machine showing the configuration of the head-lowering handle, link plate, and link with respect to the inner frame and head assembly of the described PCCMPS machine, as well as engagement of the torsion-rod pinions with a corresponding rack on the inner frame of the described PCCMPS machine. As discussed above, the head-lowering handle 202 is fixedly attached to a link plate 205 to which a link 207 is pivotable attached. The link 207 is also pivotable attached to the head-assembly frame 302. Movement of the head-lowering handle 202 downward and to the left, from the vertical position shown in FIG. 4, causes the link plate 205 to rotate about its pivot point 402, pulling the link 207 upward. Movement of the head-lowering handle 202 downward and to the right, from the vertical position shown in FIG. 4, causes the link plate 205 to rotate to the right, lowering the link 207. Raising and lowering of the link 207 imparts a vertical translation to the head-assembly 114, and the head assembly correspondingly moves upward and downward within the inner frame 210 with corresponding rotation of the torsion-rod pinions 314 and 315 as the torsion-rod pinions are translated vertically along the corresponding racks 416 and 417 cut into the inner sides of the vertical members 418 and 419 of the inner frame 210. The head assembly is stiffened and made square with respect to the base 102 and inner frame 210 of the PCCMPS machine via the torsion rods 314–315. The torsion rods run through the head assembly and are capped by pinions. The pinions engage and track with the tracks 416–417 cut into the vertical members 418–419 of the inner frame 210. The only mode of flexing available to head assembly is by vertical translation and accompanying rotation of the torsion-rod pinions as they track along the vertical tracks 418–419. The torsion-rod pinions and torsion rods are sized so that, in one embodiment, no more that 0.001 inch flexing can occur across the head structure. As a result, the head assembly of the described PCCMPS machine is low in cost, lightweight, and yet sufficiently rigid to allow for precise carving and shaping of work pieces via computer control of the cutting head assembly position and work piece position, as discussed above. The clamping rollers (318–319 in FIG. 3), in one embodiment, are ⅝" diameter steel rods with 0.5-inch thick natural gum-rubber coverings. As discussed above, these clamping rollers rotate within the clamping-roller bushings 320–323, which in turn ride within the clamping-roller mounts 328–331. The clamping-roller springs 324–327 mount between the clamping roller bushings 328–331 and the head-assembly frame 302 in order to maintain a relatively constant downward force on the work piece. When the head assembly is lowered, via the head-lowering handle 202 and locked down, the clamping rollers are pushed upward by the work piece, compressing the springs.

Figure 5:
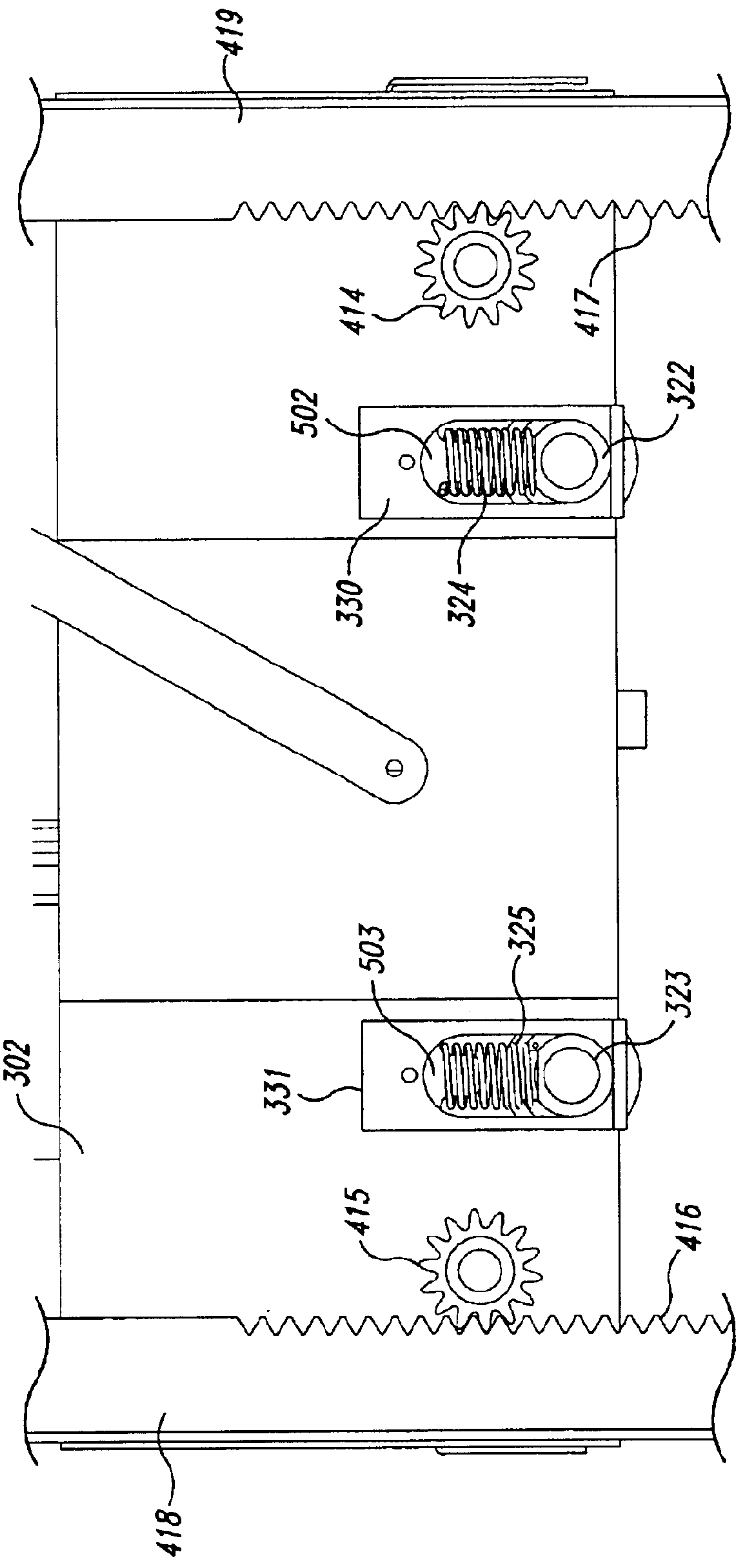
FIG. 5 is a vertical section view of the described PCCMPS machine showing, in great detail, mounting of the clamping rollers to the head-assembly frame.

FIG. 5 is a vertical section view of the described PCCMPS machine showing, in great detail, mounting of the clamping rollers to the head-assembly frame. In FIG. 5, clamping-roller springs 324 and 325 are mounted to corresponding stems 502–503 of the clamping-roller mounts 330 and 331, exerting a downward force on the clamping-roller bushings 322 and 323 mounted within the clamping-rolling mounts 330 and 331. FIG. 5 also shows the torsion-rod pinions 414–415 tracking within the vertical tracks 416 and 417 cut into the vertical members 418 and 419 of the inner frame 210 of the PCCMPS machine. In an alternate embodiment, the tracks may be separately manufactured and affixed to the vertical members.

Figure 6:
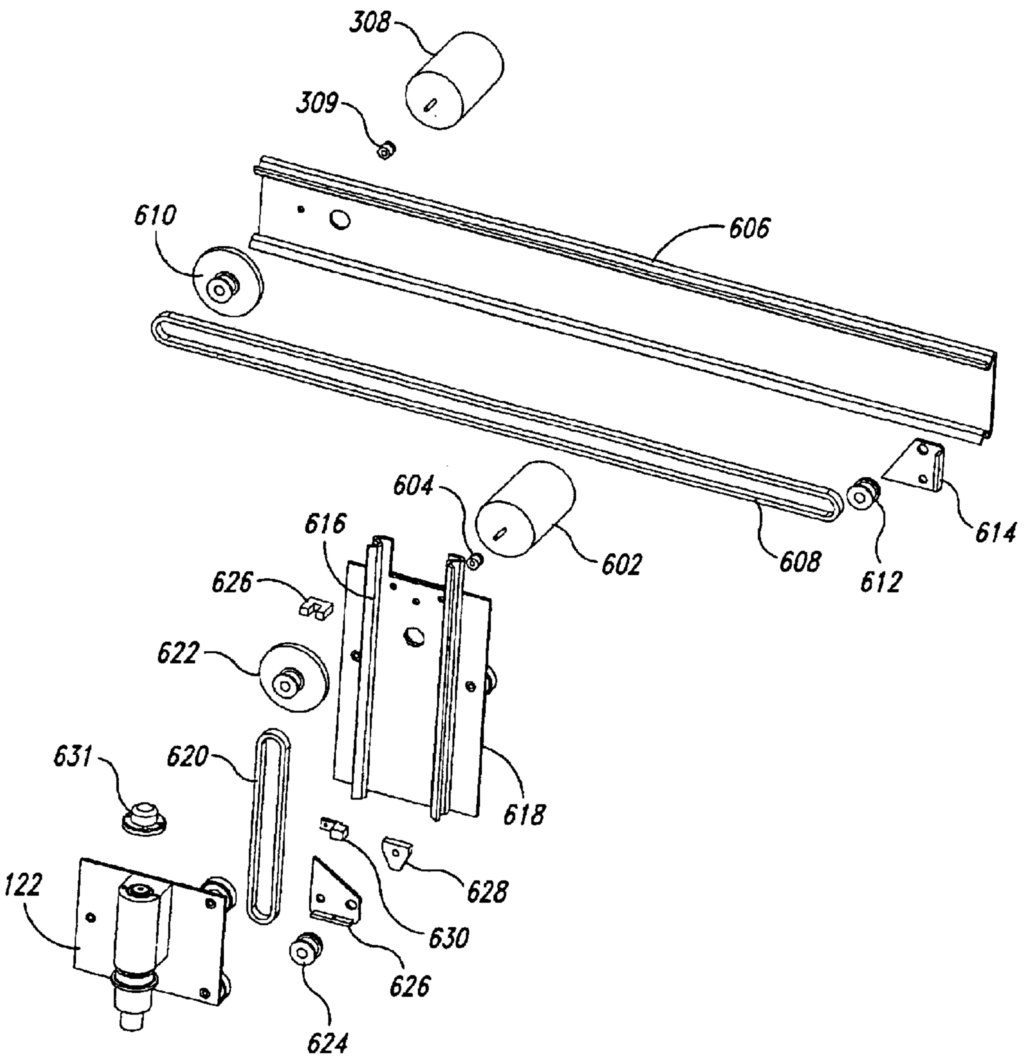
FIG. 6 is an exploded view of the y-and-z-axes assembly of the described PCCMPS machine.

FIG. 6 is an exploded view of the y-and-z-axes assembly of the described PCCMPS machine. As discussed above, a y-axis drive motor 308 and y-axis drive motor pinion 309 are mounted to the y-and-z-axis assembly in order to power y-direction translation of the cutting head assembly. In addition, a z-axis drive motor 602 and z-axis drive motor pinion 604 are mounted to the y-and-z-axes assembly to provide power to drive translation of the cutting-head assembly in the z-direct ion. The y-axis portion of the y-and-z-axes assembly includes ay-axis track 606, a y-axis tooth drive belt 608 which is mounted to grooves in y-axis drive gear and tooth pulley 610, and y-axis return tooth pulley 612. A y-axis tensioner plate 614, which is reconfigurable fixed to they-axis 606 to adjust tension in the y-axis tooth belt 608, serves as a mount for the y-axis return tooth pulley. The z-axis portion of the y-and-z-axes assembly includes a z-axis track on the inner side of a y-axis truck assembly 618 and a z-axis tooth belt 620 mounted to grooves in a z-axis drive gear and tooth pulley 622 and a z-axis tooth return pulley 624. Tension on the z-axis tooth belt 620 is adjusted via a z-axis tensioner plate 626 to which the z-axis tooth return pulley 624 is mounted. A z-homing switch 626, board sensor 628, and bit-sensor detector 630 are also included in the z-axis portion of they and z-axis assembly. They-axis portion and z-axis portion of the y-and-z-axis assemblies provide the y-direction and z-direction translation means for translating the cutter-head assembly 122 in the y-direction and z-direction, respectively. Thus the y-and-z-axis assembly is responsible for movement of the cutter-head assembly in the y-direction and z-direction. Rotation of the cutting head is powered by the cutting-head motor (306 in FIG. 3) which transfers mechanical rotation to the cutting head via the flex-shaft assembly (310 in FIG. 3) mounted through the flex-shaft terminator sheath 631. By not mounting the relatively heavy cutting-head drive motor 306 to the cutting head assembly 122, the resulting cutting-head assembly 122 is relatively lightweight, and can be easily accelerated and moved by lower-power y-axis and z-axis drive motors 308 and 602.

Figure 7:
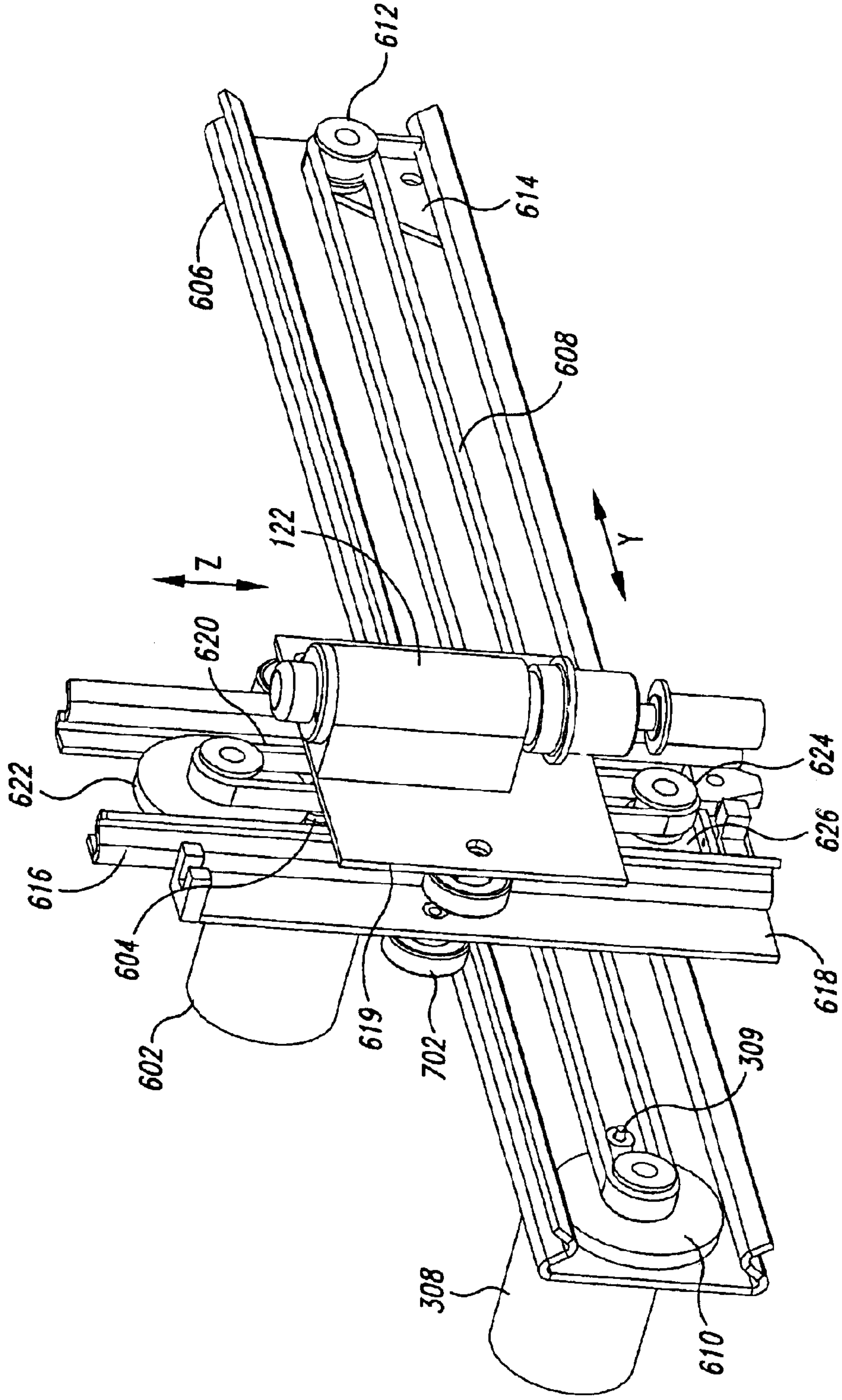
FIG. 7 is a perspective view of the y-and-z-axes assembly of the described PCCMPS machine.

FIG. 7 is a perspective view of the y-and-z-axes assembly of the described PCCMPS machine. As shown in FIG. 7, the y-axis tooth belt 608 is mounted to the y-axis drive gear and tooth pulley 610 and y-axis return pulley 612 to translate the y-axes truck assembly 618 in the y-direction. The y-axis tooth belt 608 is attached to the y-axis truck assembly 618 through a belt crimp. The y-axis truck assembly 618 rolls within the y-axis track via a number of ball-bearing rollers, one 1702 of which is partially shown in FIG. 7. Similarly, the z-axis truck assembly 619 is attached the z-axis tooth belt 620 through a belt crimp to allow the cutting-head assembly 122 to be translated in the z-direction by rolling upwards and downwards in the z-track 616, driven by the z-axis axis drive motor 602 via the z-axis drive gear and tooth pulley 622. The z-axis tooth belt 620 is mounted to grooves in the z-axis drive gear and tooth pulley 622 and the z-axis tooth return pulley 624. The y-axis return pulley is mounted to the y-axis tensioner plate 614, in turn fixed to the y-axis track 606, and the z-axis return pulley 624 is mounted to the z-axis tensioner plate 626 that is in turn mounted to the z-axis track 616. As shown in FIG. 7, the z-axis drive-motor pinion 309 is rotated by the y-axis drive motor 308 and is enmeshed with the y-axis drive gear 610 to transfer mechanical rotation to the y-axis drive gear and tooth pulley 610. A similar configuration is used to transfer mechanical rotation from the z-axis drive motor pinion 604 to the z-axis drive gear and tooth pulley 622.

Figure 8:
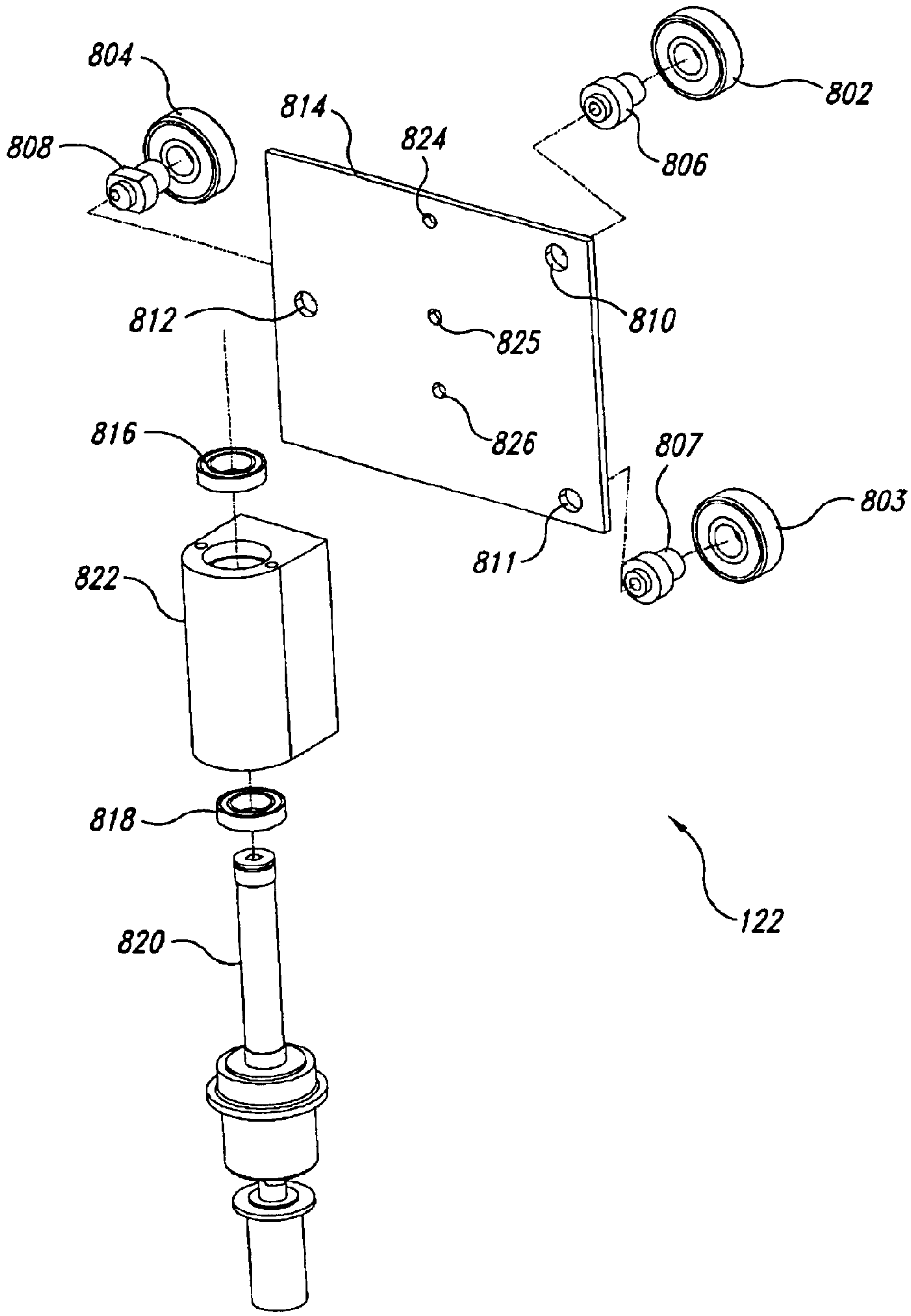
FIG. 8 is an exploded view of the z-axis track assembly of the described PCCMPS machine.
Figure 9:
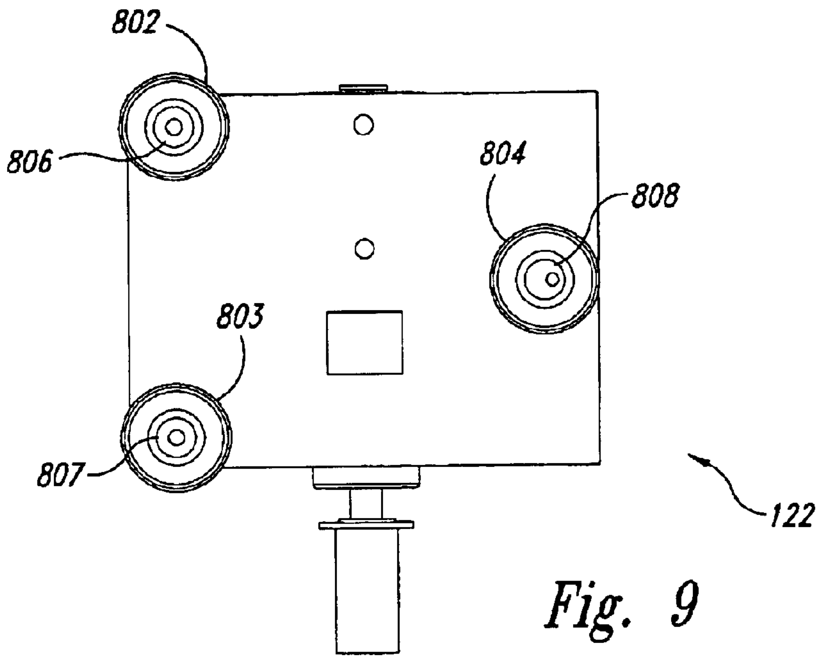
FIG. 9 is a plan view of the z-axis track of the described PCCMPS machine assembly from a side opposite of that shown in FIG. 8, illustrating a triangular configuration of the ball-bearing rollers within the z-track assembly.
Figure 10:
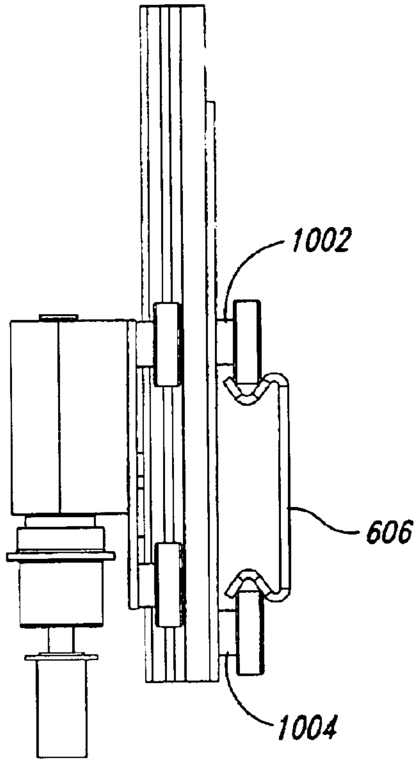
FIG. 10 is a vertical section view of the described PCCMPS machine showing ball-bearing rollers affixed to the y-axis track assembly resting within grooves of the y-axis track.

FIG. 8 is an exploded view of the z-axis truck assembly (619 in FIG. 7) of the described PCCMPS machine. The z-axis truck assembly includes three ball-bearing rollers 802–803 that are rotatably mounted to straight bearings supports 806–807 and an offset bearing support 808 through holes 810–812 in a z-truck plate 814. The cutting-head assembly, including two bearings 816 and 818, by which the quick-change assembly 820 is mounted to a spindle mount 822 affixed to the z-truck plate 814 via fasteners passing though holes 824–826 in the z-axis truck plate. The z-axis truck assembly 122, as discussed-above, rolls via ball bearing rollers 802-804 within the z-track (616 in FIG. 7) to translate the cutting-head assembly in the z-direction. FIG. 9 is a plan view of the z-axis truck of the described PCCMPS machine assembly 122 from a side opposite of that shown in FIG. 8, illustrating a triangular configuration of the ball-bearing rollers 802–804 within the z-track assembly. Ball-bearing rollers 802 and 803 are mounted to straight bearing supports 806 and 807, respectively, while ball-bearing roller 804 is mounted to the offset bearing support 808. Bearing drag can be easily adjusted by rotating the offset bearing mount 808 and tightening it down. FIG. 10 is a vertical section view of the described PCCMPS machine showing ball-bearing rollers 1002 and 1004 affixed to the y-axis truck assembly 618 resting within grooves of the y-axis track 606.

Figure 11:
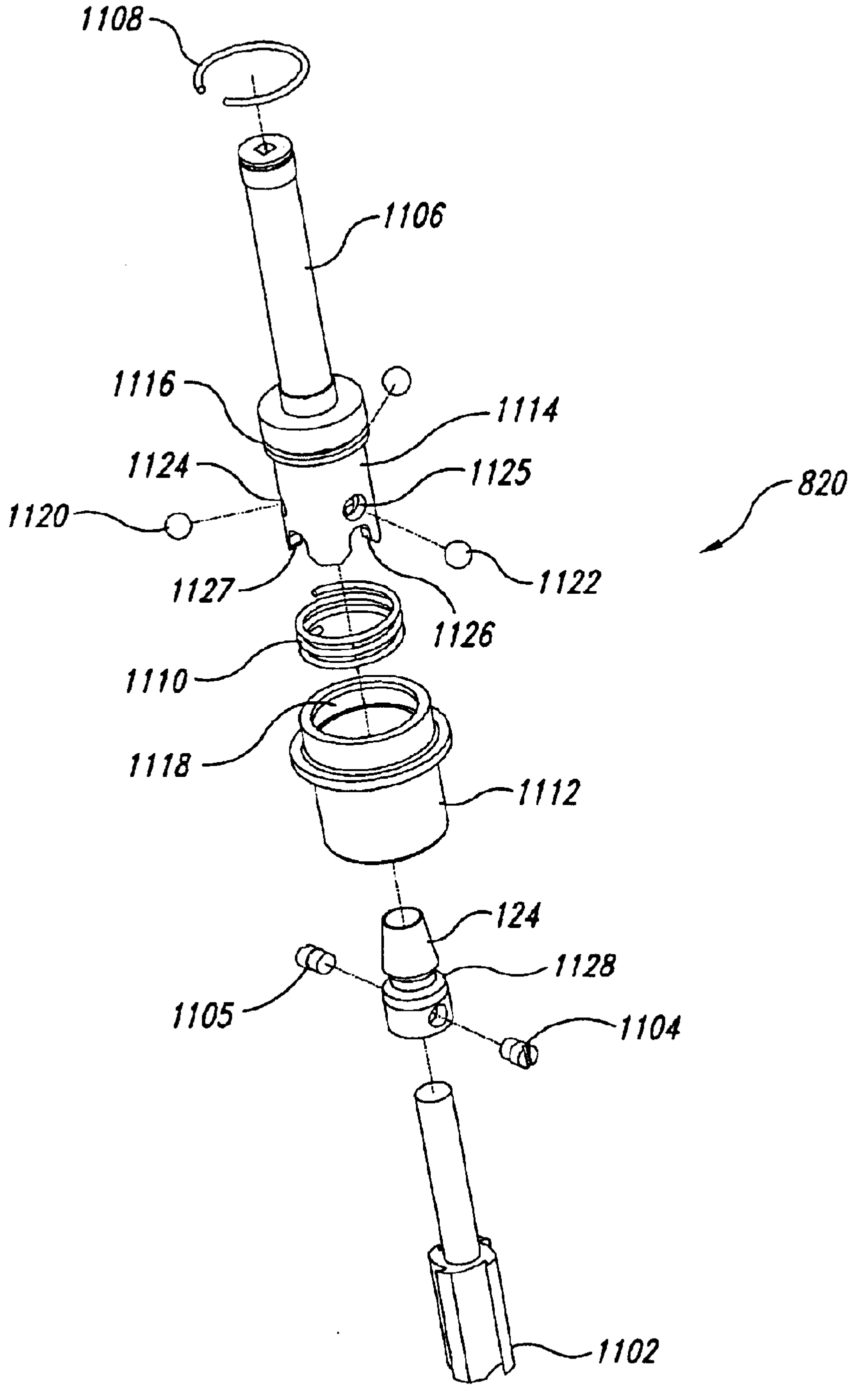
FIG. 11 is an exploded view of the quick-change assembly of the described PCCMPS machine (820 in FIG. 8).

FIG. 11 is an exploded view of the quick-change assembly of the described PCCMPS machine (820 in FIG. 8). The quick-change assembly 820 includes a bit adapter 124 into which a cutting bit 1102 is inserted and secured using set screws 1104 and 1105. A quick change spindle 1106 is inserted into the spindle mount (822 in FIG. 8) of the cutting-head assembly and retained within the spindle mount (822 in FIG. 8) by a retaining ring 1108. An actuating spring 1110 is inserted into an actuating collar 1112, and both are slipped over the base 1114 of the quick-change spindle 1106. The retaining ring 1108 holds the actuating collar 1112 and restricts its motion by fitting partially into a groove 1116 on the base 1114 of the quick-change spindle 1106, and partially into an elongated groove 1118 on the actuating collar 1112. Locking balls 1120 and 1122 are inserted into holes 1124 and 1125 in the base 1114 of the quick-change spindle 1106. The actuating spring 1110 pushes the actuating collar 1112 down. A tapered surface of the inner diameters of the actuating collar 1112 in term presses the locking balls inward. Lifting up on the actuating collar removes the inward pressure on the locking balls, allowing the locking balls to move outward. The cutting bit 1102 is inserted into the bit adapter 124 and secured using the set screws 1104–1105. The bit adapter is then inserted into the bottom end of the quick-change spindle 1106. The bit adapter and the inside bore of the quick-change spindle have matching tapers in order to assure accurate axial-bit alignment. The heads of the set screws fit into grooves 1126–1127 on the quick-change spindle. This configuration allows the spindle torque to be transferred through the bit adapter to the bit. The locking balls 1120–1122 snap into a groove 1128 in the bit adapter 1124, locking the bit adapter into place. Simply lifting up on the actuating collar 1112 releases the bit adapter and bit.

Figure 12:
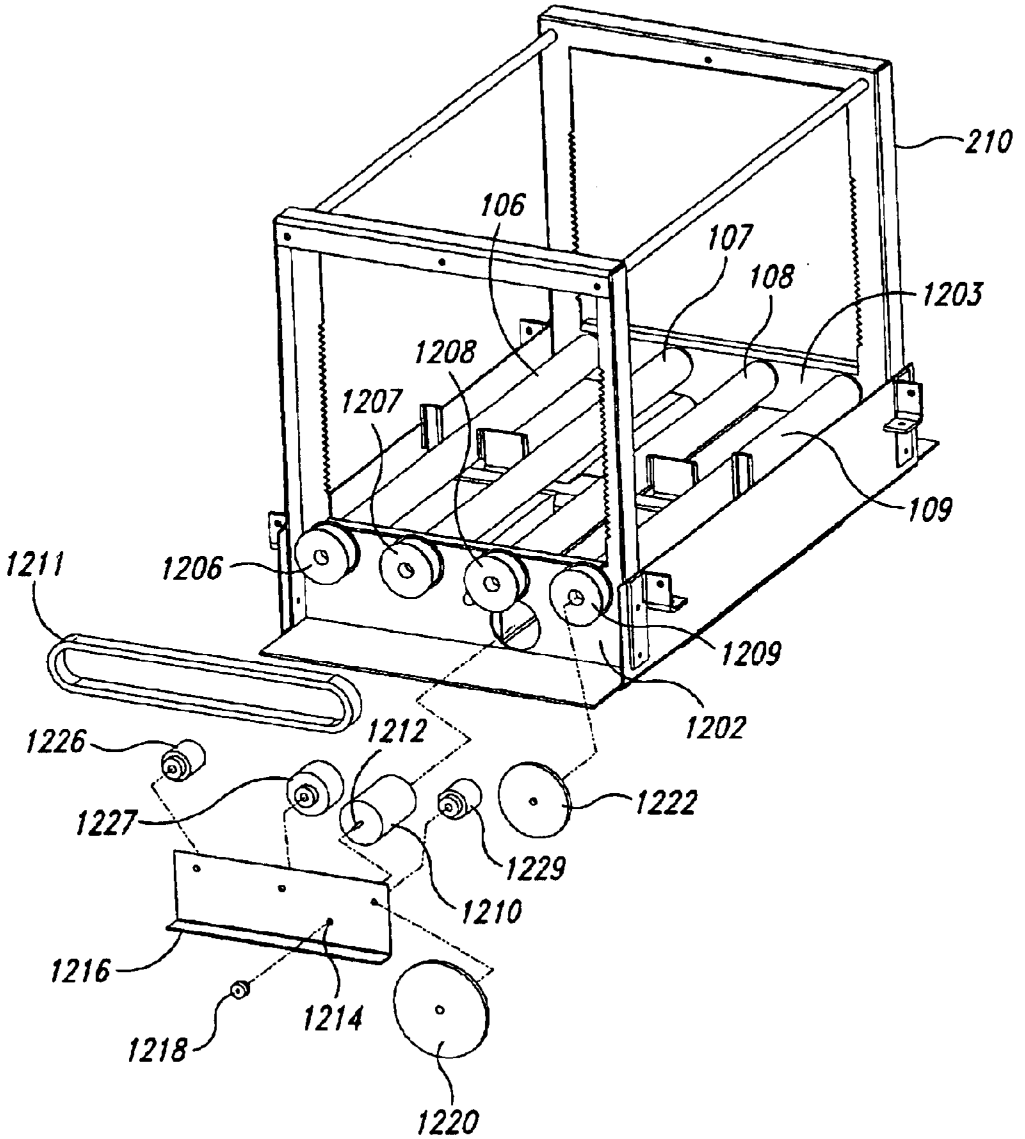
FIG. 12 is an exploded view of the base drive assembly of the described PCCMPS machine.

FIG. 12 is an exploded view of the base drive assembly of the described PCCMPS machine. The base-drive assembly included the four, lower rollers 106–109, shafts of which are inserted into bushings mounted to holes in the lower horizontal members 1202 and 1203 of the inner frame 210 of the CCMPS machine. Tooth lower-roller drive pulleys 1206–1209 are fixed to the lower-roller shafts to receive mechanical rotation transmitted by an x-axis tooth belt 1211 that is driven by an x-axis drive motor 1210. The x-axis drive motor 1210 transmits mechanical rotation through an x-axis-drive-motor shaft 1212, extending through a hole 1214 in a base-drive plate 1216, onto which an x-axis drive pinion 1218 is mounted to enmesh with, and transfer mechanical rotation to, and x-axis pinion/gear 1220. The x-axis pinion/gear 1220 pivots on the base-drive plate 1216 and engages a second x-axis drive gear 1222. The x-axis tooth pulley is mounted to the second x-axis drive gear 1222 and to the lower-roller tooth pulleys 1206–1209. X-axis belt idlers 1226–1227, and 1229 attach to the base-drive plate 1216 to ensure needed tooth engagement on all four lower-roller tooth pulleys 1206–1209.

Figure 13:
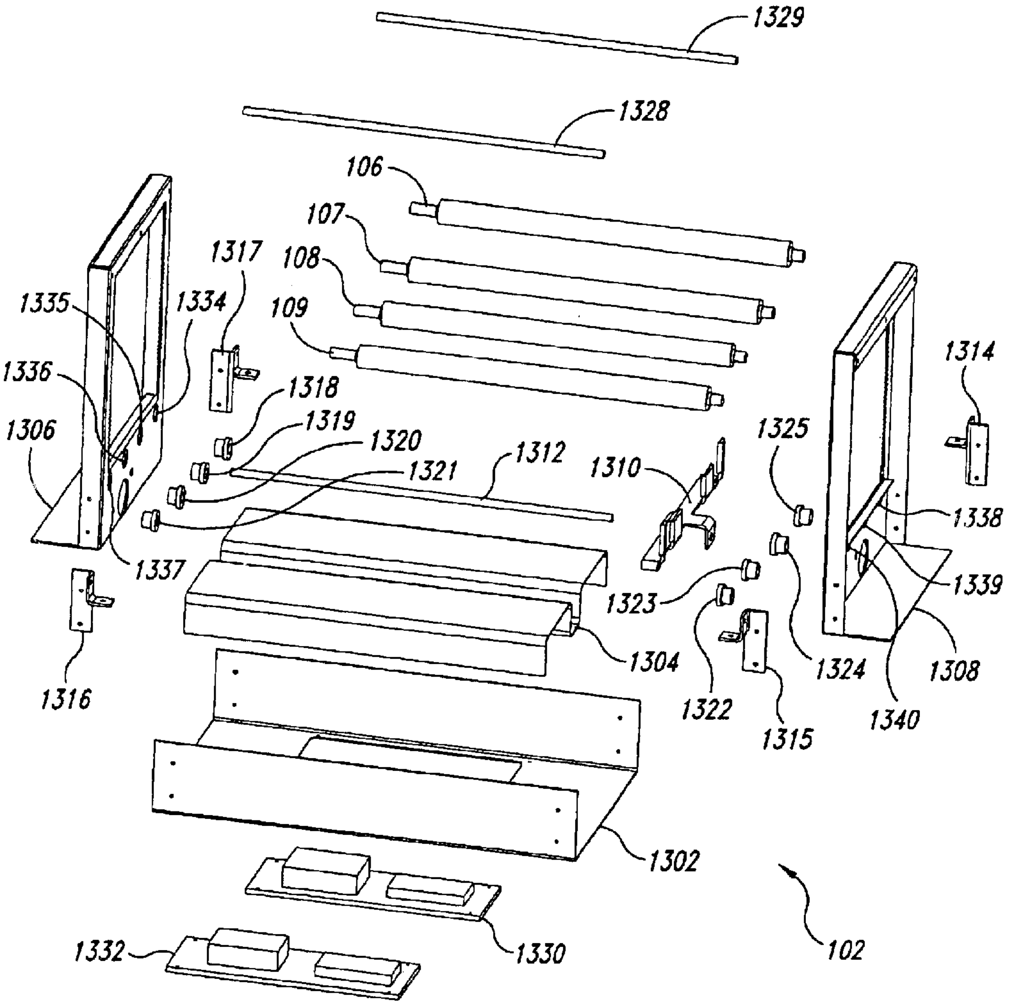
FIG. 13 is an exploded view of the base of the described PCCMPS machine.

FIG. 13 is an exploded view of the base of the described PCCMPS machine. The base 102 of the PCCMPS machine includes a lower base structure 1302, and an electronic dust cover 1304, two sides 1306 and 1308 of the inner frame (210 in FIG. 2), a squaring plate 1310, a squaring plate rod 1312, four feed-tray pivot mounts 1314–1317, eight lower-roller bushings 1318–1325, two top-support rods 1328 and 1329, a power supply 1330, and the PCCMPS built-in controller 1332. The four lower rollers 1206–1209 rotate within the drive-roller bushings 1318–1325 that are pressed into holes 1334–1340 (one hole obscured in FIG. 13) within the two sides 1306 and 1308 of the inner frame 210. The two sides of the inner frame 1306 and 1308 are mounted to the base structure 1302. The electronics dust cover 1304 is installed over the power supply 1330 and controller 1332 mounted to the bottom of the base structure 1302. The squaring plate 1310 rides on the squaring-plate rod 1312 and is installed between the electronics dust cover and drive rollers. The inner frame is further composed of the two top-support rods 1328–1329 which form upper horizontal members of the inner frame (210 in FIG. 2).

Figure 14:
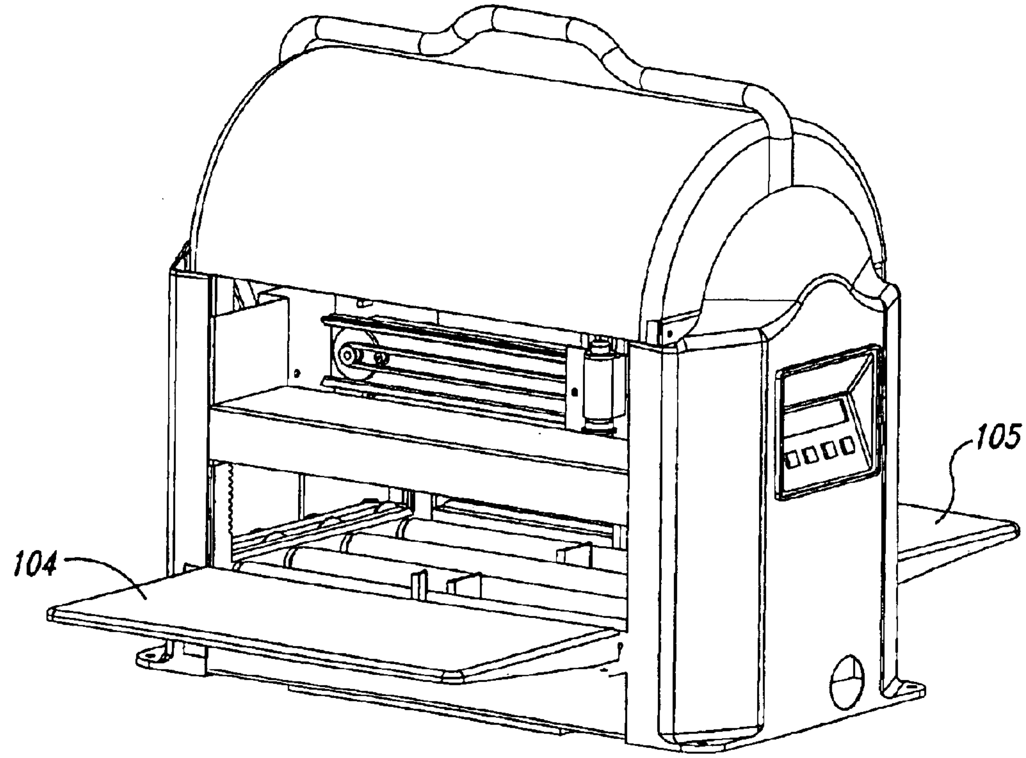
FIGS. 14 and 15 show feed trays (104 and 105 in FIG. 1) in extended and closed positions, respectively.
Figure 15:
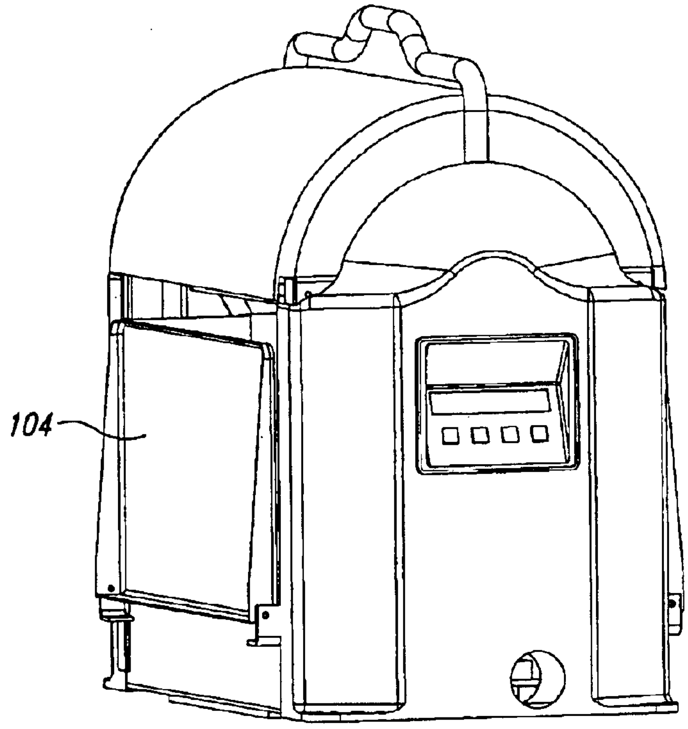

FIGS. 14 and 15 show feed trays (104 and 105 in FIG. 1) in extended and closed positions, respectively. The feed trays are extended, shown in FIG. 14, for operation of the PCCMPS machine. The feed trays provide additional support for long work pieces. The feed trays move the pivot point of the work piece further away from the PCCMPS machine to prevent the mass of the work piece from pivoting upward and overwhelming the clamping roller springs (324–327 in FIG. 3) which would in turn reduce the work piece's contact with the lower rollers through which the work piece is translated in the x-direction. As shown in FIG. 15, the feed trays may be folded up for compact storage of the PCCMPS machine.

The y-axis homing optical beam break sensor (332 in FIG. 3) is mounted to the head structure and is tripped by a tap on the y-truck assembly. The z-homing optical beam break sensor (626 in FIG. 6) is mounted to the y-truck assembly and is tripped by a tab on the z-track assembly. The bit sensor is an optical beam sensor consisting of the bit sensor emitter (334 in FIG. 3), which is mounted to the head structure, and a bit sensor detector (630 in FIG. 6), which is mounted to the y-truck assembly. The emitter detector and emitter are lined up vertically. In order to sense the bit, the y-track assembly moves over the align the emitter detector horizontally. The z-track assembly is then moved down until the bit breaks the light beam. The board sensor is an optical reflective sensor with a range of 0.25 inches and is mounted to the base of y-track assembly. Additionally sensors on the PCCMPS machine include simple contact switches on the compression collars that will shut the PCCMPS machine off in the case that there is no work piece clamped to the machine. Contact switches on safety covers that keep the operator from being able to get his or her hand near the cutting bit, when running, may also be included.

Figure 16:
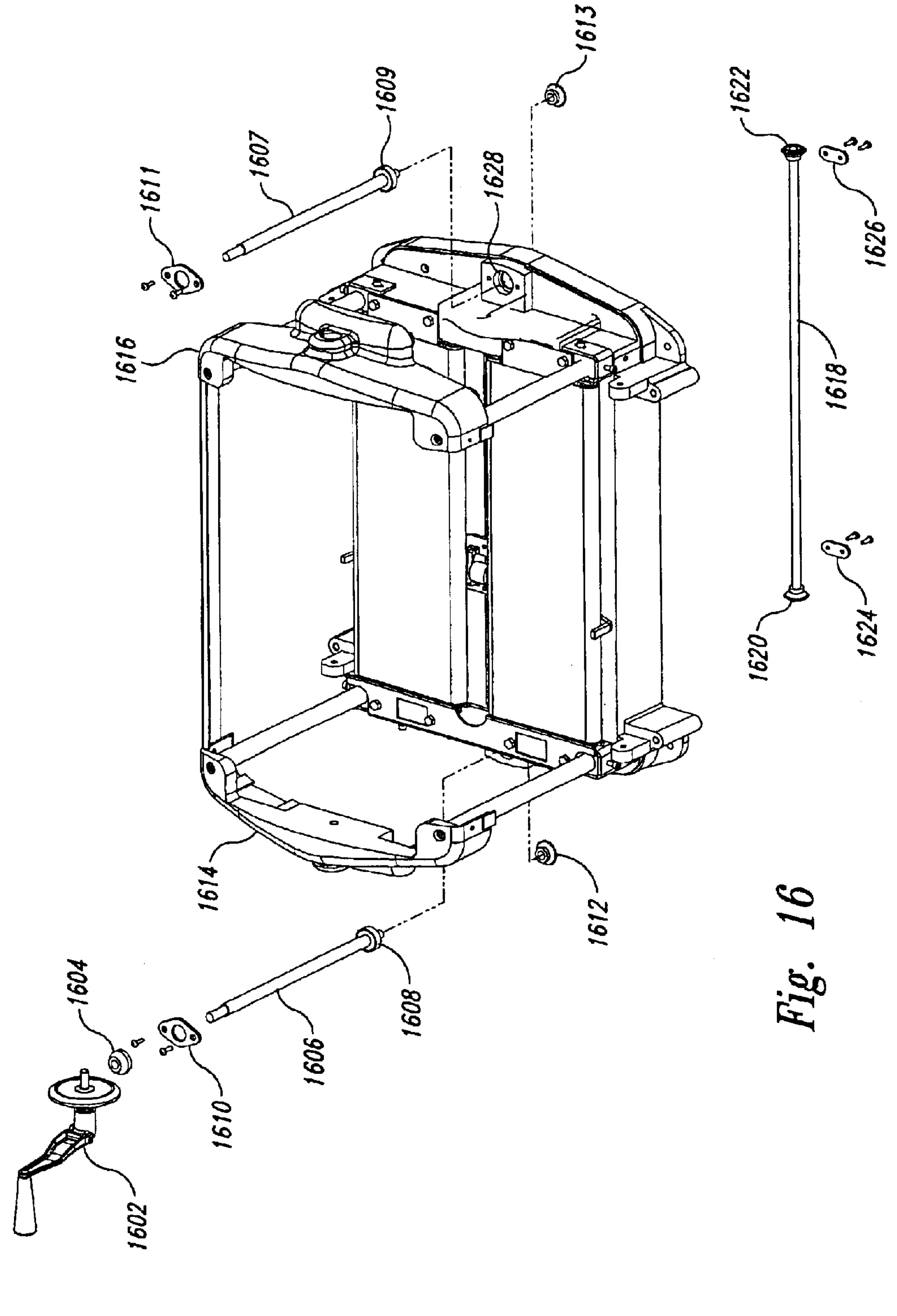
FIG. 16 shows an exploded view of an alternative crank-and-leadscrew mechanisms for raising and lowering the head assembly.

The head assembly, as discussed above, is raised and lowered via the head-lowering bar 202 and related mechanisms illustrated in FIG. 2 and 4. Many other alternative configurations are possible. Return springs can be added to the cover, and the lower can be placed to one side, and the head raising and lowering assembly may be driven by a motor. Head positioning can also be accomplished through use of a crank and leadscrews mounted to either side of the PCCMPS machine. FIG. 16 shows an exploded view of an alternative crank-and-leadscrew mechanisms for raising and lowering the head assembly. The crank-and-leadscrew mechanism includes a clutch assembly 1602, a leadscrew top bevel gear 1604, two vertical leadscrews 1606–1607, two leadscrew bearings 1608–1609, two leadscrew bearing retainers 1610 and 1611, two leadscrew bottom bevel gears 1612 and 1613, two lateral stabilizers 1614 and 1616, a leadscrew torque tie rod 1618, two tie-rod bevel gears 1620–1622, and two tie-rod retaining plates 1624 and 1626. The upper ends of the two vertical leadscrews 1606–1607 are secured in holes in the lateral stabilizers 1614 and 1616. The lower ends of the two vertical leadscrews are pressed into the leadscrew bearings 1612 and 1613 which are placed in leadscrew bearing slots 1628 (one leadscrew-bearing slot obscured) in the PCCMPS base. Torque applied to the crank assembly 1602 is transferred via the leadscrew top bevel gear 1604 to the left vertical leadscrew 1606. Torque is then transmitted to the tie-rod 1618 through the left leadscrew bottom level gear 1612 and from the tie-rod to the right vertical leadscrew 1607 via the right tie-rod bevel gear 1622 and the right leadscrew bottom bevel gear 1613.

Figure 17:
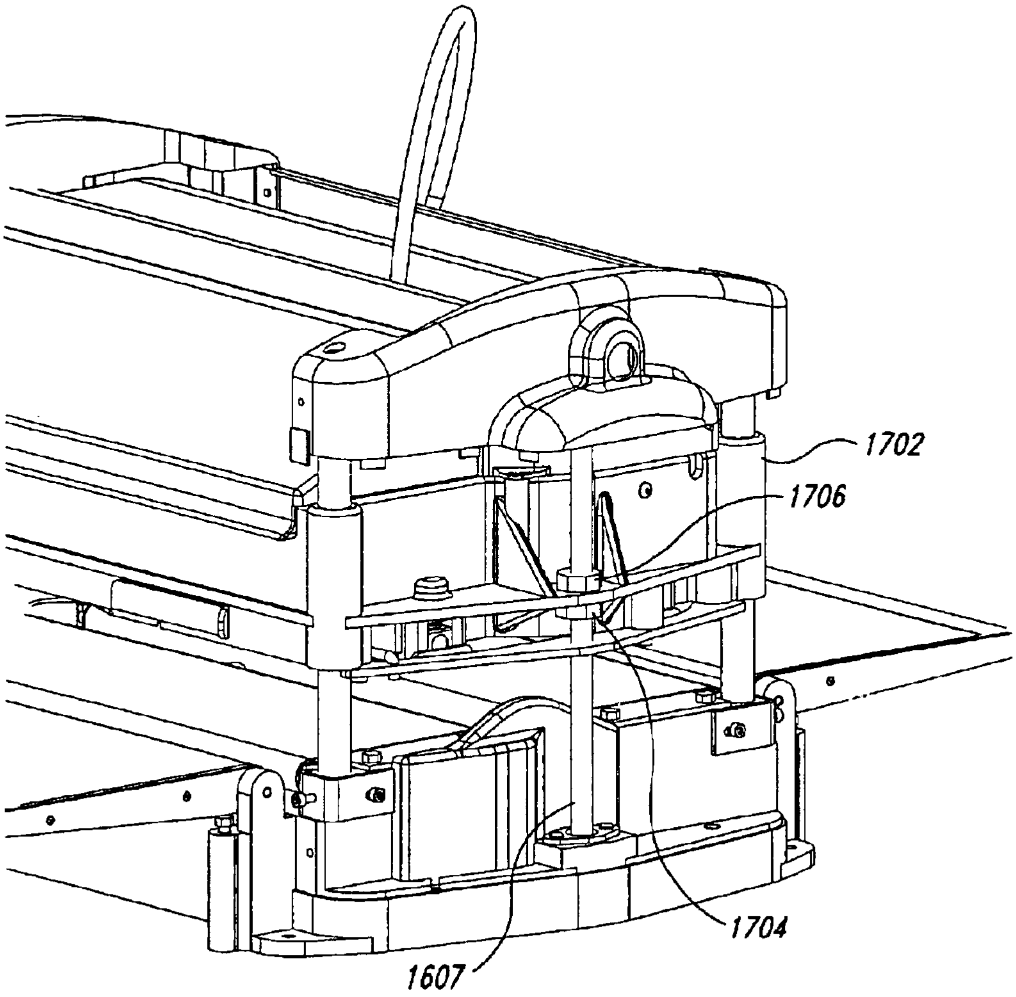
FIG. 17 illustrates the interface between the head assembly and the vertical leadscrews.

FIG. 17 illustrates the interface between the head assembly and the vertical leadscrews. The head assembly modified to accommodate the crank and leadscrew configuration 1702 is translator up and down in the z-direction when torque is applied to the crank assembly 1602 is FIG. 16. An internally threaded leadscrew nut 1706 and a jam nut 1704 are threaded onto the vertical leadscrew 1607. The vertical leadscrew and leadscrew nut have matching threads and therefore, as torque is applied to the crank assembly and the vertical leadscrew is turned, the vertical leadscrews move up and down along the vertical leadscrew 1607. The leadscrew nut is secured in a hole in the head assembly and prevented from rotating by the jam nut 1704.

Figure 18:
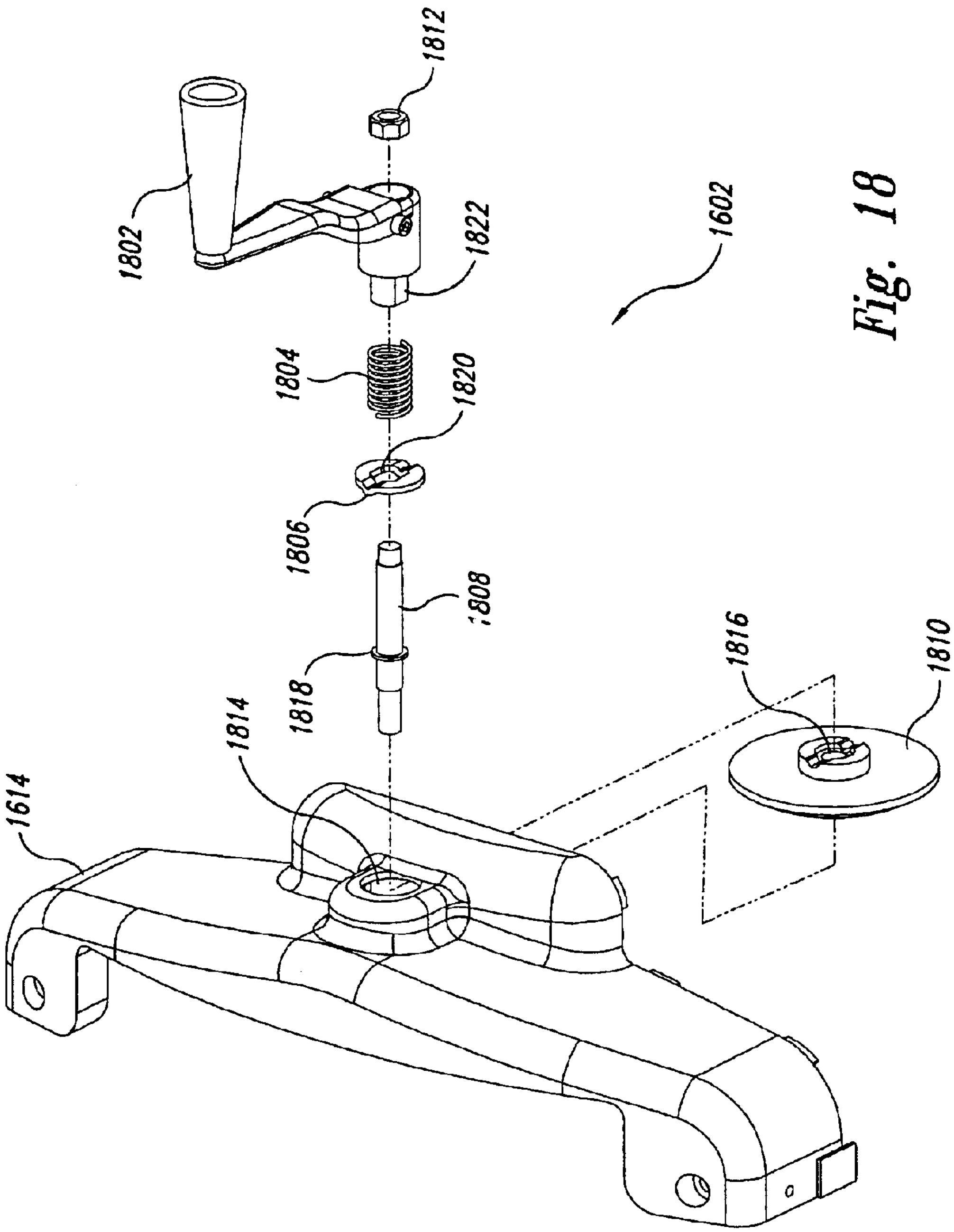
FIG. 18 is an exploded view of the crank assembly (1602 in FIG. 16).
Figure 19:
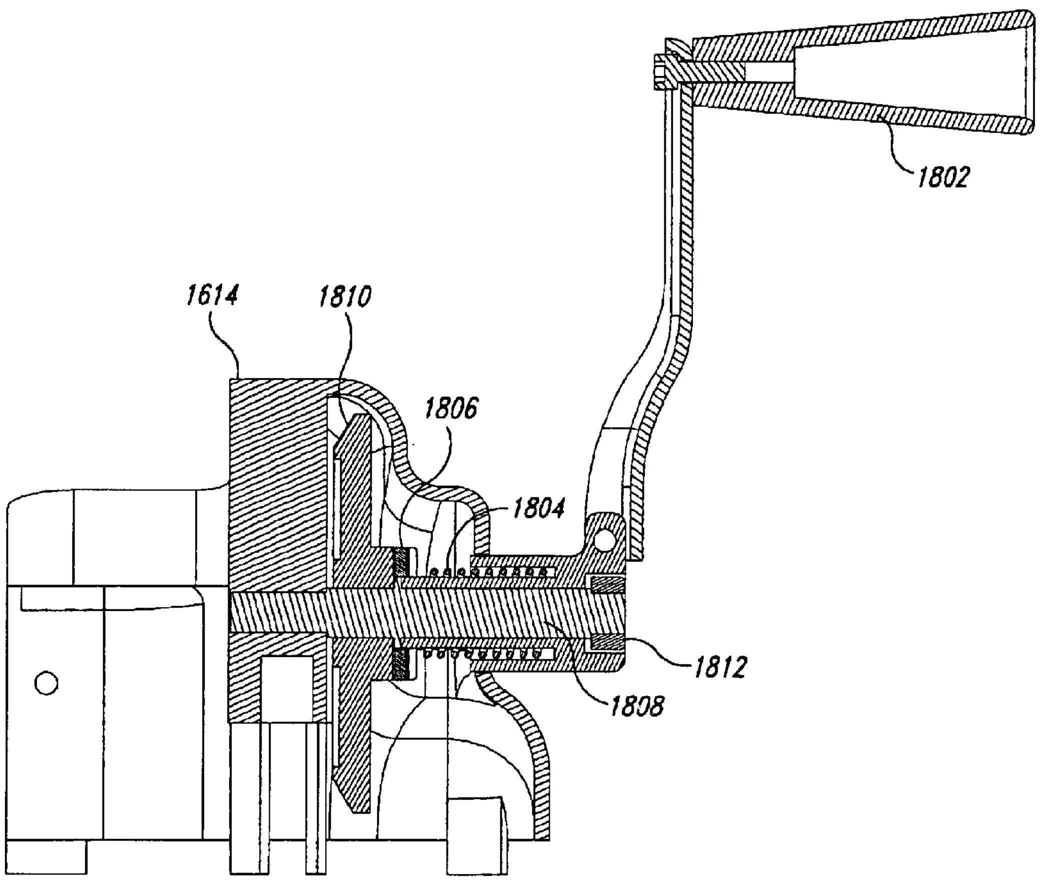
FIG. 19 is a section view of the crank assembly (1602 in FIG. 16).

FIG. 18 is an exploded view of the crank assembly (1602 in FIG. 16). The crank assembly incorporates a simple slip clutch to ensure that the head assembly is forced down onto the work piece with a consistent force. The crank assembly consists of a crank handle 1802, a pre-load spring 1804, a torque slip plate 1806, a crank assembly shaft 1808, a lateral stabilizer 1614, a slotted bevel gear 1810, and a handle-retaining nut 1812. The crank-assembly shaft 1808 is inserted through a hole 1814 in the lateral stabilizer 1614, through a hole 1816 in the slotted bevel gear 1810, and threaded into the wall of the lateral stabilizer 1614. The slotted bevel gear 1810 is free to rotate, but is constrained along the shaft by the lateral stabilizer wall and a flange 1818 on the crank-assembly shaft 1808. The pre-load spring 1804 and the torque slip plate 1806 are slid onto the keyed crank handle and the torque slip plate is constrained from rotating but its internal flats 1820 and by the flats 1822 on the crank handle. The crank handle, slip and torque slip plate are assembled onto the crank-assembly shaft and retained by the crank-handle retaining nut 1812. Once assembled, the pre-load spring 1804 forces the torque slip plate 1806 and slotted bevel gear 1810 together. The frictional force between the two eliminates relative motion between them until a threshold torque is exceeded and the torque slip plate slips. The torque at which this slipping occurs can be adjusted by changing the spring or the geometry of the assembly. The leadscrews may also be synchronized by a gear set, belt system, or a wrapped cable system. FIG. 19 is a section view of the crank assembly (1602 in FIG. 16).

Figure 20:
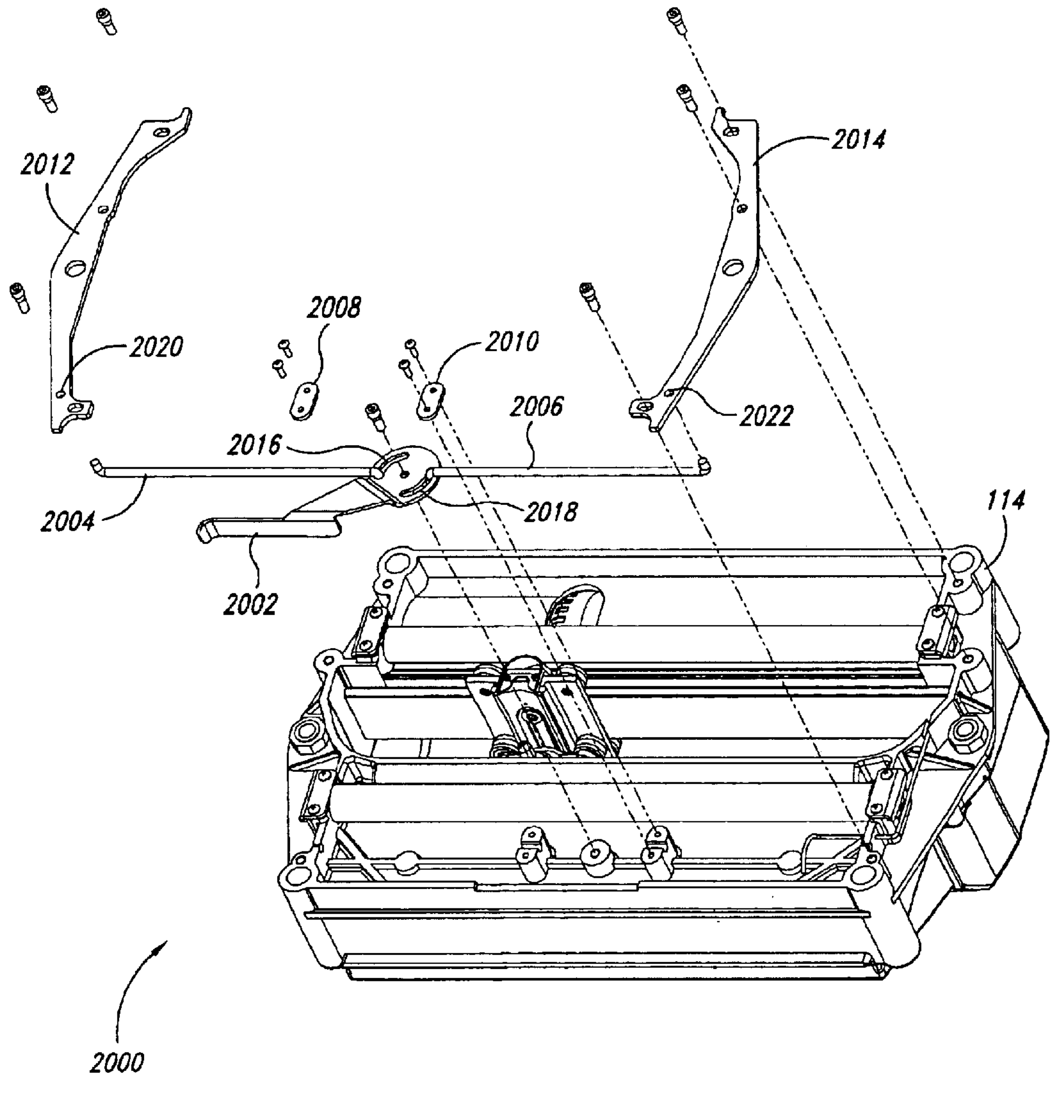
FIG. 20 is an exploded view of a pre-loaded friction clamp system.

Head locking may be accomplished within the PCCMPS machine using a friction clamp, a detent system, or a ratchet. FIG. 20 is an exploded view of a pre-loaded friction clamp system. The pre-loaded friction clamp system 2000 includes a lock-down handle 2002, two lock-down draw rods 2004 and 2006, two lock-down draw rod retainers 2008 and 2010, and two lock-down clamp arms 2012 and 2014. The lock-down handle 2002 pivots about its center and contains two variable radius slots 2016 and 2018 in which one end of the each of the lock-down draw rods 1204 and 1206 ride. The other ends of the lock-down draw rods 2004 and 2006 are inserted into holes 2020 and 2022 in the lock-down clamp arms 2012 and 2014, respectively, which also pivot.

Turning the lock-down handle 2002 forces the lock-down draw rods 2004 and 2006 along the variable radius slots 2016 and 2018, drawing the lock-down draw rods 2004 and 2006 in towards the center of the handle 2002. This forces the lock-down clamp arms 2012 and 2014 to pivot and in turn pre-loads them against vertical rails (not shown in FIG. 20) of the inner frame 210 of the PCCMPS machine, locking the head assembly 114 into place.

Figure 21:
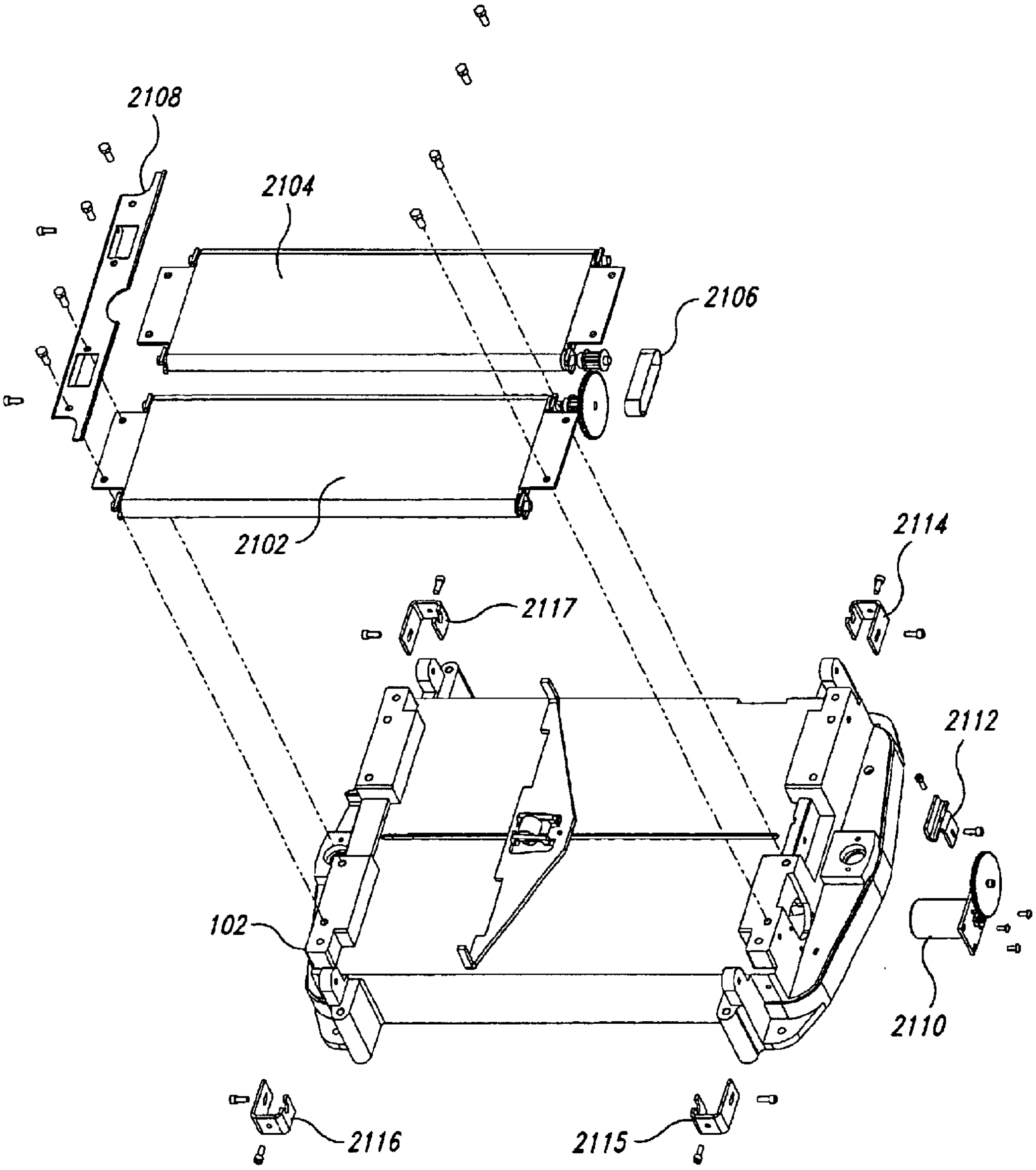
FIG. 21 is an exploded view of a two-belt conveyor system.
Figure 22:
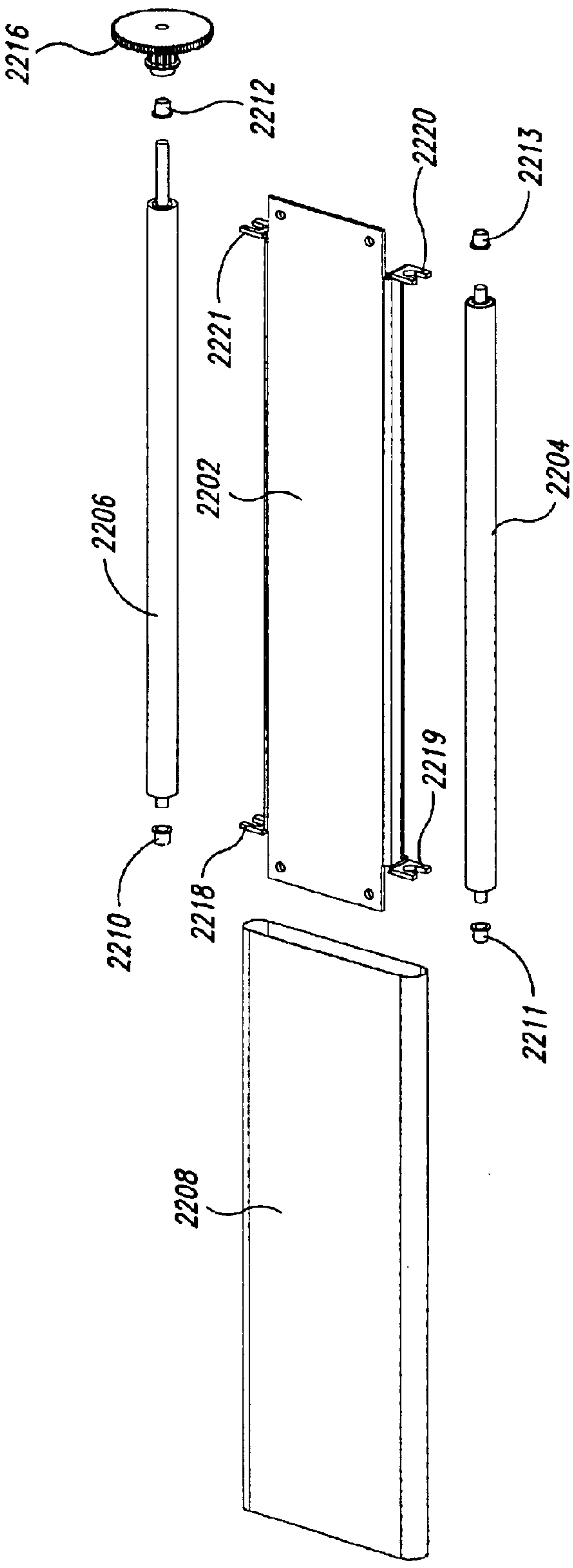
FIG. 22 shows an exploded view of a conveyor-belt assembly (2102 and 2104 in FIG. 21).
Figure 23:
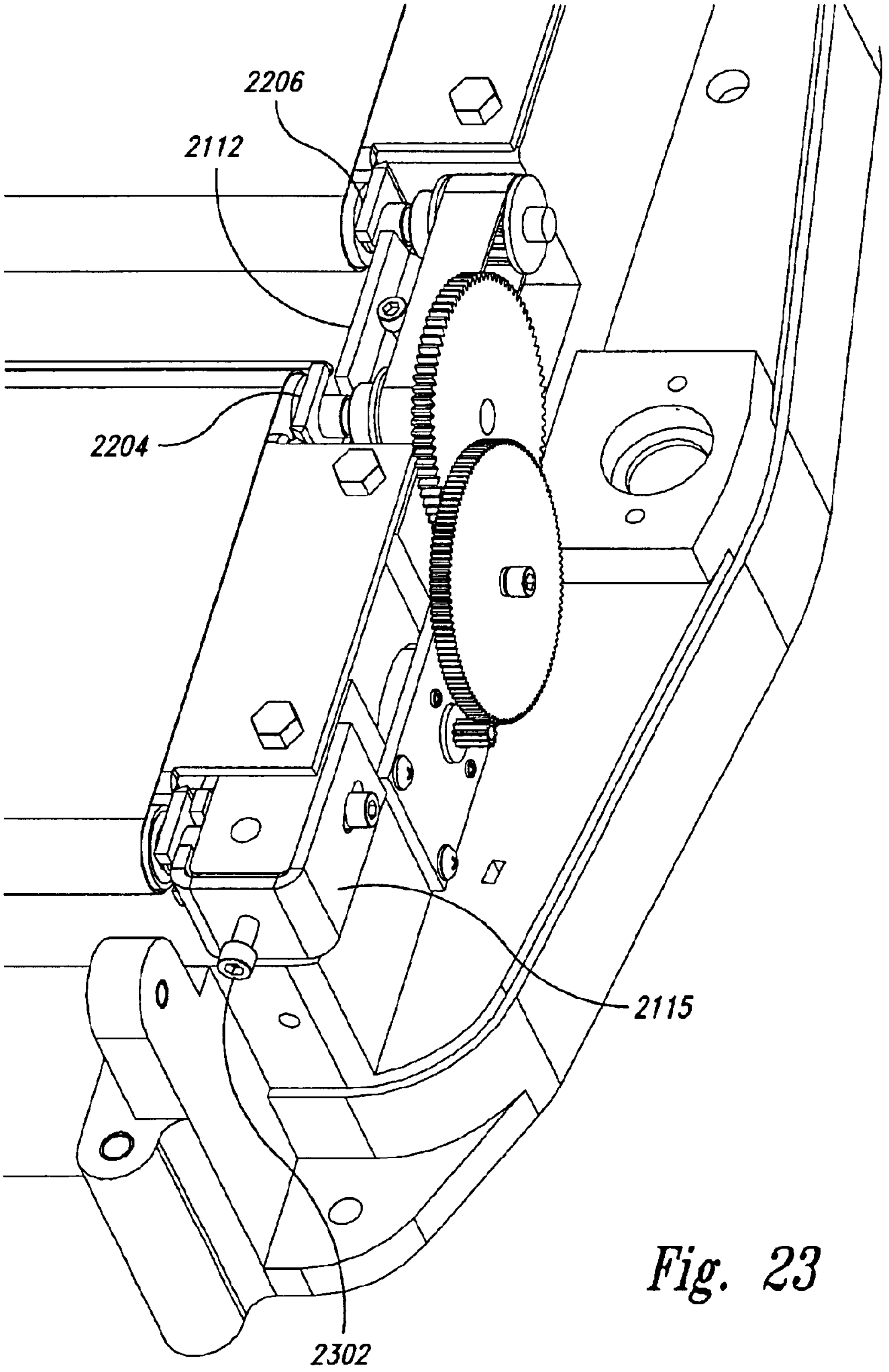
FIG. 23 is a perspective view of the fully assembled conveyor system shown in FIG. 21.

The base drive system can be configured in many different ways in alternate embodiments. For example, a different number of lower rollers may be used. Alternatively, power to translate the work piece in the x-direction may be applied to the clamping rollers, rather than the lower rollers. In some embodiments, the lower rollers may be completely omitted. In another embodiment, the lower rollers may be replaced with a conveyor belt system. The conveyor belt system may be made up of one continuous conveyor belt or two separate conveyor belts, one lying between a pair of front rollers and the other running between a pair of rear rollers. Conveyor belts may comprise a number of high friction surface materials, such as rubber or sand paper. FIG. 21 is an exploded view of a two-belt conveyor system. The conveyor-belt system includes a front conveyor belt assembly 2102, and rear conveyor belt assembly 2104, a tooth drive belt 2106, a squaring strong back 2108, a drive-belt motor assembly 2110, a drive belt tensioning plate 2112, four conveyor belt assembly alignment/tensioning brackets 2114–2117, and the PCCMPS machine base 102. The front and rear conveyor belts 2102 and 2104 are tied together rotationally with the tooth drive belt 2106, which is driven by the drive belt motor assembly 2110. The squaring strong back 2108 acts a guide that keeps the work piece straight as it feeds through the machine. The drive belt tensioning belt 2112 pre-tensions the drive belt and ensures that the front and rear conveyor belts always turn at the same rate. Conveyor belt assembly alignment/tensioning brackets 2114–2117 allow for full tracking adjusting and tensioning of the conveyor belt system. FIG. 22 shows an exploded view of a conveyor-belt assembly (2102 and 2104 in FIG. 21). The conveyor belt assembly consists of a belt support tray 2202, a passive idle roller 2204, a rubberized drive roller 2206, a conveyor belt 2208, four roller bushings 2210–2213, and the drive roller gear/pulley 2216. The roller bushings 2210–2213 are assembled onto the ends of the idle and drive rollers 2204 and 2206 and are inserted into slots 2218–2221 mounted to the belt support tray 2202. The conveyor belt 2208 is slipped over both rollers 2204 and 2206 and rides on the belt support tray 2202, which provides a very flat surface on which the work piece can move back and forth in the x-direction. The drive roller gear/pulley 2216 is secured to the rubberized drive roller 2206 and the gear transmits torque from the drive belt motor assembly (2110 in FIG. 21). The pulley rotationally ties the front conveyor belt assembly (2102 in FIG. 21) to the rear conveyor belt assembly (2104 in FIG. 21). FIG. 23 is a perspective view of the fully assembled conveyor system shown in FIG. 21. The drive-belt tensioning plate 2112 forces the drive rollers 2206 apart and induces tension in the drive belt. The conveyor belt assembly alignment/tensioning brackets 2115 are adjusted by turning the adjustment screw 2302 to ensure proper conveyor belt tension and tracking.

Figure 24:
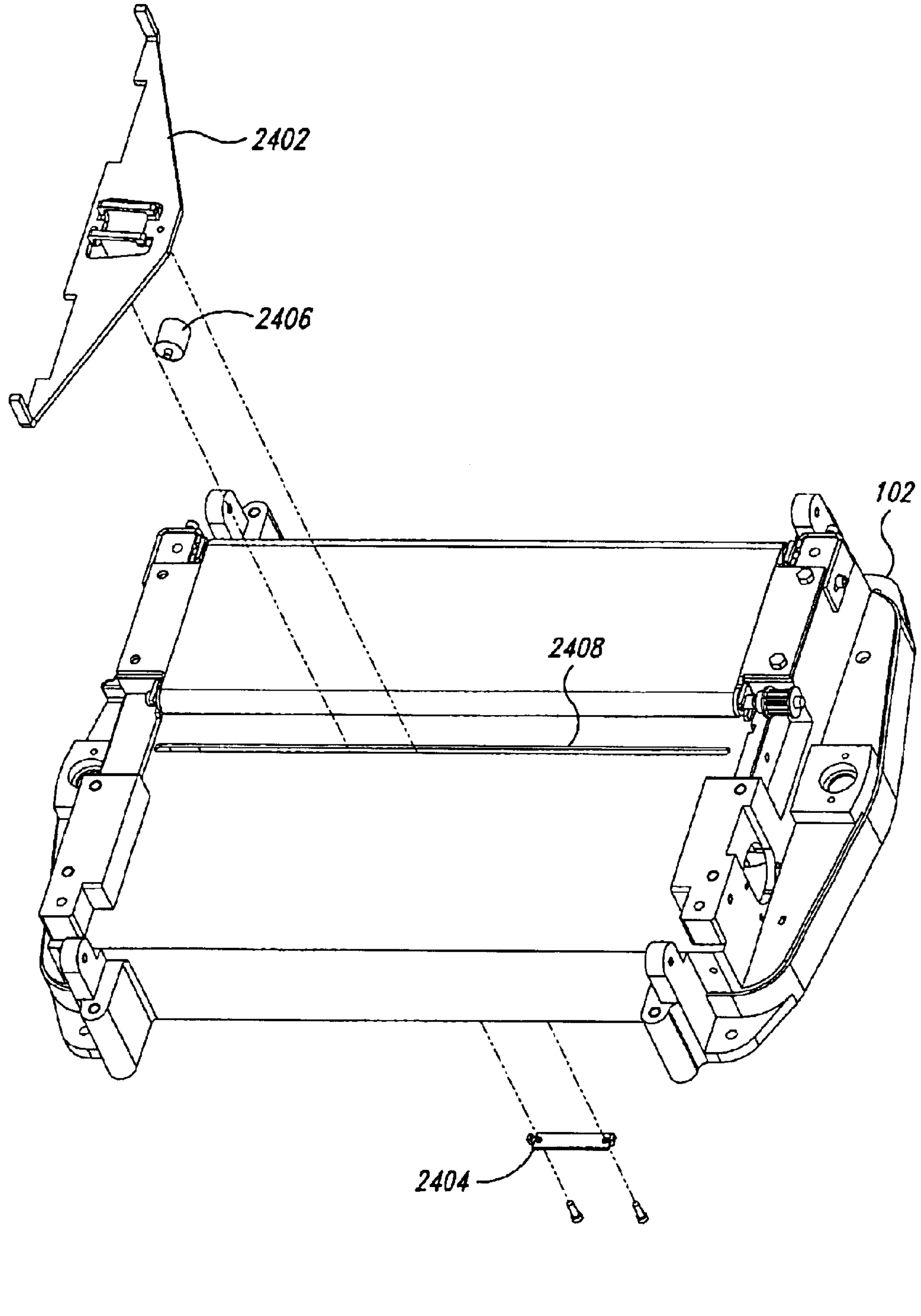
FIG. 24 shows an alternative embodiment of a work-piece squaring mechanism.

FIG. 24 shows an alternative embodiment of a work-piece squaring mechanism. It consists of a squaring plate 2404, a squaring plate retainer 2404, and a locking thumb wheel 2406. The squaring plate slides along a precision groove 2408 in the base 102, which keeps its square both through the base and head assembly operational, the work piece is inserted in the machine and pushed up against the squaring strong back (2012 in FIG. 20). The squaring plate 2402 is then adjusted so that the work piece is constrained between it and the squaring strong back 2012, ensuring that the work piece feeds in and out of the machine in a predictable and repeatable way.

Figure 25:
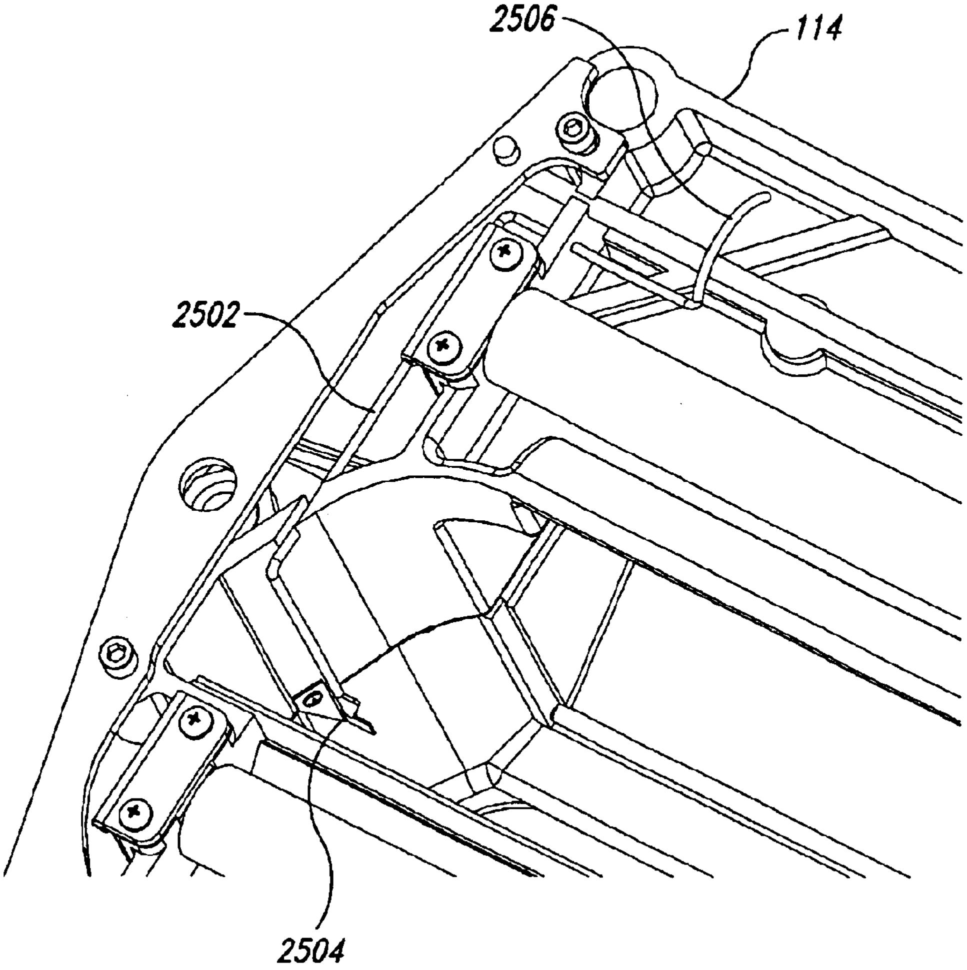
FIG. 25 shows a work-piece height sensor.

FIG. 25 shows a work-piece height sensor. The work-piece height sensor consists of a ridged height gauge wire 2502 and height sensor flag 2504. The height sensor flag 2504 is attached to the ridged height gauge wire 2502, which is mounted in a slot in the underside of the head assembly 114 and is free to rotate. If a work pieces is mounted in the PCCMPS machine, the arc 2506 of the ridged height gauge wire rests on the surface of the work piece and is free to rotate. An optical beam break sensor located on the y-truck assembly measures the position of the height sensor flag 2504.

Although the present invention has been described in terms of a particular embodiment, it is not intended that the invention be limited to this embodiment. Modifications within the spirit of the invention will be apparent to those skilled in the art. For example, PCCMPS machine can be equipped with a large number of different types of accessories. A bit change out system can be added to the PCCMPS machine, consisting of the rack that fits in front of the PCCMPS machine and holds a number of bit. When actuated, the rack moved down and engages the collar of the quick-change assembly, releasing the bit into the rack. The cutting head assembly is then moved into a position corresponding to the next desired bit stored within the rack and is then translated down to engage the stored bit. The rack then moves out of the way, leaving the new bit in the quick-change spindle. A three dimensional scanner may be added. A three dimensional consists of a probe connected to a simple contact switch. The scanner allows the machine to electronically map the surface of an existing work piece. Optical scanning methods are also possible including a small camera. Additional support plates for feeding thin or small pieces may be included, as well as custom bits, feed support stands, and dust collection systems. Various safety shields may also be added to the PCCMPS machine. The PCCMPS machine can be scaled to almost any size. PCCMPS machine may also be adapted for use within a rigid or semi-rigid material. In addition to the mechanical cutting head described in the above embodiment, a laser head may used for laser engraving and cutting, a sand-blasting head could be added for etching, and ink-jet or air brush heads may be employed for painting and staining work pieces. The PCC-MPS machine can be augmented, as discussed above, to perform a number of stand alone functions, including planing, sanding, joining, edge routing, routing, dadoing, dove tailing, and bisect joining. The PCCMPS machine is capable of cutting wood or other rigid or semi-rigid materials using an end mount or zip bit. Cutting may be significant improved by oscillating the cutting head assembly in the z-axis while engaging the bit with the work piece.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A processor-controlled carving and multi-purpose shaping device to modify a work piece, the processor-controlled carving and multi-purpose shaping device comprising:

a cutting head to mount a work-piece-modifying-device;

a head-assembly that includes lateral and vertical translators to translate the cutting head in lateral and vertical directions, wherein the head-assembly is lowered and raised by means of a head-raising-and-lowering means;

a work-piece translator that translates the work piece in a horizontal direction; and a controller to control the lateral, vertical and horizontal translators in order to place the work-piece-modifying device at specified positions on or within the work piece and to move the work-piece-modifying device along specified paths on or within the work piece in order to modify the work piece.

2. The processor-controlled carving and multi-purpose shaping device of claim 1 wherein the processor-controlled carving and multi-purpose shaping device modifies the work piece by one or a combination of: shaping the work piece using a shaping-bit work-piece-modifying device;

routing the work piece using a routing-bit work-piece-modifying device;

drilling the work piece using a drill-bit work-piece-modifying device; and cutting the work piece using a cutting-bit work-piece-modifying device.

3. The processor-controlled carving and multi-purpose shaping device of claim 1 further including a host computer interconnected with the controller.

4. The processor-controlled carving and multi-purpose shaping device of claim 3 wherein the host computer electronically stores a work-piece design and generates and transmits a corresponding series of commands to the controller in order to direct the controller to modify the work piece to conform to the stored work-piece design.

5. The processor-controlled carving and multi-purpose shaping device of claim 4 wherein the host computer provides a graphical user interface to allow an operator to create the work-piece design that the host computer electronically stores.

6. A method for modifying a work piece comprising: providing the processor-controlled carving and multi-purpose shaping device of claim 5; creating a work-piece design using the graphical user interface provided by the host computer;

feeding an unfinished work piece into the processor-controlled carving and multi-purpose shaping device; and inputting a command to the graphical user interface provided by the host computer to direct the host computer to direct the controller to modify the work piece according to the work-piece design.

7. The processor-controlled carving and multi-purpose shaping device of claim 4 wherein the host computer provides a graphical user interface to allow an operator to create a set of commands that the host computer electronically stores.

8. A method for modifying a work piece comprising: providing the processor-controlled carving and multi-purpose shaping device of claim 7;

creating a set of commands using the graphical user interface provided by the host computer;

feeding an unfinished work piece into the processor-controlled carving and multi-purpose shaping device; and inputting a command to the graphical user interface provided by the host computer to direct the host computer to direct the controller to modify the work piece by carrying out the set of commands.

9. The processor-controlled carving and multi-purpose shaping of claim 3 wherein the host computer electronically stores a set of commands and transmits the set of commands to the controller in order to direct the controller to modify the work piece.

10. The processor-controlled carving and multi-purpose shaping device of claim 1 wherein the controller controls the speed of rotation of a mechanical cutting head and wherein the controller also controls a lateral-translation drive motor, a horizontal-translation drive motor, and a vertical-translation drive motor.

11. The processor-controlled carving and multi-purpose shaping device of claim 10 wherein the controller receives input from sensors embedded in the processor-controlled carving and multi-purpose shaping device to sense at least work-piece position information, and the controller adjusts the speed of rotation of the mechanical cutting head, and also adjusts the lateral-translation drive motor, the horizontal-translation drive motor, and the vertical-translation drive motor to position the cutting head relative to the work-piece position information.

12. The processor-controlled carving and multi-purpose shaping device of claim 1 wherein the head-assembly includes rotationally mounted torsion rods with torsion-bar pinions that engage tracks on vertical, internal frame members of the processor-controlled carving and multi-purpose shaping device.

13. The processor-controlled carving and multi-purpose shaping device of claim 1 wherein the lateral translator comprises a first toothed belt, powered by a gear and pulley enmeshed with a pinion affixed to the shaft of a lateral-translation drive motor, and a vertical-axis truck affixed to the first toothed belt.

14. The processor-controlled carving and multi-purpose shaping device of claim 13 wherein the vertical axis truck comprises a second toothed belt, powered by a gear and pulley enmeshed with a pinion affixed to the shaft of a vertical-translation drive motor, and a cutting-head assembly affixed to the second toothed belt.

15. The processor-controlled carving and multi-purpose shaping device of claim 1 wherein the work-piece translator comprises drive rollers rotatably mounted to a base member of the processor-controlled carving and multi-purpose shaping device and driven by a toothed belt powered through a gear and pulley mechanism by a work-piece translator drive motor.

16. The processor-controlled carving and multi-purpose shaping device of claim 15 further including spring-mounted clamping rollers that clamp a work piece between the clamping rollers and the drive rollers.

17. The processor-controlled carving and multi-purpose shaping device of claim 1 including an input device to allow a user to directly enter commands transmitted to the controller.

18. A method for modifying a work piece comprising: feeding an unfinished work piece into the processor-controlled carving and multi-purpose shaping device of claim 17; and inputting commands to the input device to direct the controller to modify the work piece by carrying out the commands.

* * * * *